(12) United States Patent
Sakurada et al.

(10) Patent No.: US 6,895,359 B2
(45) Date of Patent: May 17, 2005

(54) WORKPIECE COORDINATE SYSTEM ORIGIN SETTING METHOD, WORKPIECE COORDINATE SYSTEM ORIGIN SETTING PROGRAM AND WORKPIECE COORDINATE SYSTEM ORIGIN SETTING DEVICE OF A SURFACE PROPERTY MEASURING MACHINE

(75) Inventors: Junji Sakurada, Sapporo (JP); Tsukasa Kojima, Sapporo (JP); Toshiyuki Tamai, Sapporo (JP)

(73) Assignee: Mitutoyo Corporation, Kawasaki (JP)

(*) Notice: Subject to any disclaimer, the term of this patent is extended or adjusted under 35 U.S.C. 154(b) by 8 days.

(21) Appl. No.: 10/698,443

(22) Filed: Nov. 3, 2003

(65) Prior Publication Data

US 2004/0107073 A1 Jun. 3, 2004

(30) Foreign Application Priority Data

Nov. 25, 2002 (JP) ........................................ 2002-340930

(51) Int. Cl.$^7$ ................................................ G01B 3/22
(52) U.S. Cl. ........................... 702/167; 33/503; 345/443
(58) Field of Search ........................... 702/167; 378/62, 378/98; 33/503, 502; 73/1.79; 345/443, 157, 162, 179

(56) References Cited

U.S. PATENT DOCUMENTS 5,117,757 A * 6/1992 Marks ......................... 102/287
5,432,703 A * 7/1995 Clynch et al. ............... 700/163
6,062,948 A * 5/2000 Schiff et al. .................... 451/9

FOREIGN PATENT DOCUMENTS

JP     A 11-339052     12/1999
JP     A 2000-331171     11/2000

* cited by examiner

*Primary Examiner*—John Barlow
*Assistant Examiner*—Hien Vo
(74) *Attorney, Agent, or Firm*—Oliff & Berridge, PLC

(57) ABSTRACT

The object of the invention is to provide a method, a program and a device that can set accurately and easily the origin of the coordinate system of a workpiece based on the result obtained by a surface texture measuring machine scanning over a feature area on the surface of the workpiece. The device comprises a data inputter for inputting data obtained by scanning a feature area including at least a feature point area and a non-feature point area of the surface of a workpiece, a feature point selector for extracting the feature points of the data by statistically processing the data inputted into the data inputter and an origin setter for setting the origin of a workpiece coordinate system relative to an origin setting target point of the workpiece based on the coordinate values of the feature point obtained by the feature point selector.

26 Claims, 10 Drawing Sheets

WORKPIECE COORDINATE SYSTEM ORIGIN SETTING METHOD, WORKPIECE COORDINATE SYSTEM ORIGIN SETTING PROGRAM AND WORKPIECE COORDINATE SYSTEM ORIGIN SETTING DEVICE OF A SURFACE PROPERTY MEASURING MACHINE

RELATED APPLICATIONS

This application claims priority to the Japanese Patent Application 2002-340930 dated on Nov. 25, 2002 and is hereby incorporated with reference for all purposes.

BACKGROUND OF THE INVENTION

1. Technical Field

The present invention relates generally to setting of the origin of a surface texture measuring machine represented by a roundness measuring machine, a surface roughness tester, a contour measuring machine and a three (3)-dimensional coordinate measuring machine and, more specifically, to a method, a program and a device for workpiece coordinate system origin setting.

2. Background Art

A detector used in a surface texture measuring machine such as a roundness measuring machine, a surface roughness tester and a contour measuring machine and having a structure in which a stylus is provided at the tip of a lever capable of shaking freely in a direction perpendicular to the surface of a workpiece is widely used. In a state where the stylus is in contact with the surface of a workpiece, data are collected by scanning the detector in the direction along the surface of the workpiece. Based on the data obtained as described above, the surface texture of the workpiece is analyzed, the coordinates of the workpiece are obtained and the dimensions of the workpiece are obtained.

Now, since a detector having such a structure is a one (1)-axis detector detecting the unevenness in the direction of its shaking (Z-axis direction being the vertical direction for a detector of a surface roughness tester and a contour measuring machine and, X-axis direction being the direction to back and forth for a detector of a roundness measuring machine), the data of the surface of a workpiece in the direction perpendicular to the shaking direction are difficult to obtain. For example, it is difficult to detect directly a portion having a feature in its shape such as an edge of a workpiece (that is a corner portion of the workpiece and often forms an angle of 90° in general).

Thus, conventionally, the shape of the workpiece is estimated and feature portions of the workpiece are estimated by analyzing the shape of the scanning locus based on the data obtained by scanning the detector along the surface of a workpiece.

For example, FIG. 17 shows a scanning locus K drawn by the central point of a contacting ball Q when a stylus S having the contacting ball Q at its tip is scanned over an area including a workpiece edge $W_e$, along the surface of a workpiece W in order to collect the data necessary for analyzing the shape of the workpiece.

The arrow of the scanning locus K shows the direction of scanning. The scanning locus K is a row of points in an actual case. When the tip of the stylus is not ball-shaped but partially a ball such as an arc, the scanning locus is drawn by the central point of the arc. A point "A" on the scanning locus K indicates the starting point of the scanning of the central point of the contacting ball and a point D indicates the edge point of the scanning.

In FIG. 17, the portion of the scanning locus K from the point A to a point B is almost a straight line since scanning is carried out in a state where the lower tip of the contacting ball Q is in contact with the workpiece W. During the scanning from the point B to a point C of the scanning locus K, the ball tip portion (a slanting side portion) of the contacting ball Q gradually changes its contacting point relative to the workpiece edge $W_e$. Consequently, the scanning locus from the point B to the point C is an arc in which the ball shape of the contacting ball Q is transferred. For the portion of the scanning locus K from the point C to a point D, the scanning locus K is almost a straight line within this region since the left side of the contacting ball Q has scanned the right side of the workpiece W.

Conventionally, the point B or the point C of the scanning locus K obtained as above, or the intersection of a line AB and a line CD are obtained using a form analysis, and the origin of the workpiece coordinate system is set based on those points and the intersection obtained.

Here, as methods for the form analysis, for example, those described in Japanese Patent Application Laid-Open Pub. Nos. Hei11-339052 and 2000-331171 can be used. However, those methods are not for setting the origin.

For example, according to the form analysis method described in Japanese Patent Application Laid-Open Pub. No. Hei11-339052, the shape of a workpiece is estimated by executing a geometrical element analysis according to a procedure described as follows.

(1) A portion of input data (the initial fitting portion) is extracted.
(2) Fitting is executed for the initial fitting portion using a evaluation function.
(3) A radius of curvature R is obtained from the obtained parameters.
(4) The shape of the initial fitting portion is determined to be a line element when the radius of curvature of the portion is larger than a predetermined value, and to be a circular element when the radius of the curvature of the portion is smaller than the predetermined value.
(5) Parameters of the element determined (a line or a circle) are obtained.
(6) $\epsilon_i = f(x, y)$ is obtained using these parameters and a fitting function and errors are checked one by one from i=1.
(7) If "i" has exceeded the initial fitting portion, steps (2)–(6) are repeated further adding data one by one until an error $\epsilon_i$ exceeds a predetermined value.
(8) Adjacent elements are determined by repeating again the steps (1)–(7) from the data with which the error $\epsilon_i$ has exceeded the predetermined value as a starting point.
(9) Steps (1)–(8) are repeated for all the input data.
(10) Intersections are obtained by extending the geometrical elements.
(11) If the distance from an input data to an intersection has exceeded a predetermined value, edge points of adjacent elements are connected to each other with connecting lines.

According to the form analysis method described in Japanese Patent Application Laid-Open Pub. No. 2000-331171, the shape of a workpiece is estimated by executing a geometrical element analysis according to a procedure described as follows.

(1) A portion of input data (the initial fitting portion) is extracted.
(2) Fitting is executed for the initial fitting portion using a plurality of evaluation functions.

(3) If an error of the initial fitting portion is within the tolerance provided to each shape element, the initial fitting portion is extended as its shape element and the steps (2)–(3) are repeated.

(4) The shape element for which the initial fitting portion can be extended longest is determined as the shape element for a first portion.

(5) Steps (1)–(4) are repeated with the next data of the first portion as their starting point.

(6) Steps (1)–(5) are repeated for all the data.

(7) Intersections are obtained by extending both of adjacent geometrical elements as their elements.

(8) If the distance from an input data to an intersection has exceeded a predetermined value, edge points of adjacent elements are connected to each other with connecting lines.

Furthermore, conventionally, there is a method according to which the origin of the coordinate system of a workpiece is set based on intersections of the shape elements analyzed by executing a form analysis of a scanning locus of a stylus (for example, Japanese Patent Application Laid-Open Pub. No. 2002-270307).

However, a calculation process accompanied by a complicated analysis is necessary for the data in order to estimate feature points such as an edge portion of a workpiece and to set a feature point correctly as the origin of the workpiece coordinate system. Thus, conventionally, much time is necessary for the calculation process. Otherwise, to create a large calculation program is necessary.

For example, a numerical control technique used for a machine tool and a three (3)-dimensional coordinate measuring machine may be applied to a surface texture measuring machine. For the setting of the workpiece coordinate system necessary for such an application, it is necessary to execute the setting of the origin of the workpiece coordinate system using a calculation method of intersections based on the conventional form analysis. Thus, conventionally, much time is necessary for the process. Otherwise, to create a large calculation program is necessary when the numerical control technique used for a machine tool etc. is tried to apply to a surface texture measuring machine.

In other words, when a surface texture measurement of a workpiece is carried out using the numerical control technique, it is a premise that the origin of the workpiece coordinate system is defined correctly. However, in a surface texture measurement, minute areas and minute shapes are often handled generally. Furthermore, since there are cases where a workpiece itself is very small, it is very difficult to determine at which point of the workpiece the origin should be set because visual confirmation is difficult. Therefore, conventionally, it is necessary to collect data over a relatively large area of the workpiece surface and obtain the position of the origin based on the result of the form analysis. However, conventionally, much time is necessary for measurement and much time is also necessary for the form analysis process. When the shape of the feature area is complicated, it may be approximated to a simple shape and sufficient accuracy can not be obtained in that case. Furthermore, very sufficient accuracy can not be obtained even when a complicated form analysis has been executed.

DISCLOSURE OF THE INVENTION

The present invention was conceived in view of the above conventional tasks. The object of the invention is to provide a method, a program and a device that can set accurately and easily the origin of a coordinate system of a workpiece based on the result obtained by scanning over a feature area on the surface of the workpiece.

In order to achieve the above object, the workpiece coordinate system origin setting method according to the invention comprises an input step, a feature point selection step and an origin setting step.

Here, in the input step, data are inputted, that are collected by scanning over a feature area including at least a feature point area and a non-feature point area of the workpiece surface, with a detector of a surface texture measuring machine for measuring a surface texture by scanning the surface of a workpiece.

In the feature point selection step, the coordinate values of the feature points in the data obtained in the input step is extracted by processing statistically the data.

In the origin setting step, the origin of a workpiece coordinate system is set relative to an origin setting target point of the workpiece based on the coordinate values of the feature points obtained in the feature point selection step.

The term, "feature point area" used herein refers to an area containing a feature point such as an edge portion area (a corner area of a workpiece), a protrusion area, a recess area of a workpiece. That is, this "feature point area" means a very small area (for example, 10 µm in front and behind) containing a feature point. The "non-feature point area" not always refers to only a line or a plane, but also other areas such as, for example, an area adjacent to a feature point area but containing no above described feature points.

The term, "data" used herein refers to coordinate information in the direction of the driving axis of a detector and coordinate information in the direction of the detection axis of the detector for each point. As the detector of the invention, those of contact type and non-contact type can be used. The expression, "the origin of a workpiece coordinate system is set relative to an origin setting target point of the workpiece" refers to the cases including the case where the origin is set at a feature point of a workpiece that corresponds to a feature point of data and the case where the origin is set at an origin setting target point other than the feature points of the workpiece.

Consequently, in the invention, the origin of a workpiece coordinate system can be set by extracting feature points from the data of a feature point area using a statistical processing. Therefore, according to the invention, coordinate values of feature points in the data can be extracted by a simple statistical calculation process without executing any complicated form analysis calculation process. Thereby, according to the invention, the origin of a workpiece coordinate system can be set easily and quickly. Furthermore, according to the invention, coordinate values of feature points in the data can be extracted in real time by scanning over a feature point area of the workpiece and by inputting the data, while simultaneously applying a statistical processing to the inputted data. Thereby, according to the invention, the setting of the origin of a workpiece coordinate system can be executed more easily and more quickly.

According to the invention, it is preferable that the data inputted in the input step is machine coordinate system data determined uniquely by the surface texture measuring machine.

The term, a "machine coordinate system data" refers to the data based on a coordinate system determined by a specific origin which the measuring machine has, and does not depends on the shape and size of a workpiece. Therefore, according to the invention, input of data at the time of the preparation of a measurement at which no accurate workpiece coordinate system origin has not been determined can be executed securely since measurements to be obtained do not depend on the workpiece coordinate system origin respectively determined for each workpiece.

Input Step

Furthermore, according to the invention, it is preferable that the input step includes a predetermined area removing step.

Here, in the predetermined area removing step, data of a predetermined area not necessary for the statistical processing in the feature point selection step are removed from the inputted data.

That is, in general, recesses and protrusions such as groove portions and rise portions are often included in the vicinity of an edge portion of a workpiece. Errors may be generated in extracting feature points when the statistical processing is applied to the data containing such portions.

Therefore, according to the invention, extraction of feature points can be executed accurately by removing the data of predetermined areas that may generate errors in extracting feature points such as recesses and protrusions as described above.

Furthermore, according to the invention, it is preferable that the input step includes a singular point removing step.

Here, in the singular point removing step, uncommon singular point data are removed from the inputted data.

As a result, according to the invention, even when various protruded noises caused by voltage fluctuation of the power source etc. are contained in the data, extraction of feature points can be executed accurately since such protruded noises can be removed as singular point data.

Furthermore, according to the invention, it is preferable that, in the singular point removing step, singular point data protruded from the data are removed using a robust estimation.

Consequently, according to the invention, even when the singular point data are removed, the data of the workpiece are maintained accurately since any phase distortion caused by a conventional low-pass filter process etc. is not generated. As a result, according to the invention, there is no error generated in the statistical processing and the extraction of feature points can be executed accurately.

Trigger Level

According to the invention, it is preferable that, in the feature point selection step, the coordinate values of feature points of the data are determined based on a trigger level set in advance for the data obtained in the input step. It is preferable that, in the origin setting step, the coordinate values of the feature points obtained in the feature point selection step are corrected based on correction values corresponding to the magnitude of the trigger level and the origin of the workpiece coordinate system is set relative to an origin setting target point of the workpiece.

Consequently, according to the invention, it is possible to easily detect the point at which the coordinate values of data obtained by scanning over areas including the edge portion area of the workpiece with a detector such as a stylus varies suddenly, by comparing it with the trigger level. Furthermore, according to the invention, it is possible to accurately execute the setting of the origin since the origin of the workpiece coordinate system can be set after correcting the coordinate values of the feature points using the correction values corresponding to the magnitude of this trigger level.

The trigger level according to the invention can be provided in a direction perpendicular to the scanning direction of the detector such as a stylus. For example, when the scanning direction is the X-axis direction, the trigger level is provided in the Z-axis direction. When the scanning direction is the Z-axis direction, the trigger level is provided in the X-axis direction. Thereby, according to the invention, protrusions and recesses in a direction perpendicular to the direction of the workpiece surface can be easily determined.

Reference Line

Furthermore, according to the invention, it is preferable that, in the feature point selection step, the coordinate values of the feature points of the data are determined based on a statistical reference line of the data of the non-feature point area in the data obtained in the input step.

Consequently, according to the invention, even when the driving direction of the detector such as a stylus and the direction of the workpiece surface including feature point areas are not same, it is possible to obtain accurately the feature points of the data based on a reference line after obtaining the reference line from line portions of the data corresponding to the non-feature point areas of the workpiece surface. Therefore, according to the invention, it is possible to execute accurate origin setting excluding the influence of the relative inclination of the workpiece surface.

(1) Trigger Level

According to the invention, it is preferable that, in the feature point selection step, the coordinate values of the feature points of the data are determined based on a point at which the data obtained in the input step exceeds a predetermined trigger level set based on the reference line. It is preferable that, in the origin setting step, the coordinate values of the feature points obtained in the feature point selection step are corrected based on a correction value corresponding to the magnitude of the trigger level, and the origin of the workpiece coordinate system is set relative to an origin setting target point of the workpiece.

Consequently, according to the invention, it is possible to obtain the reference line from the line portions (non-feature point areas) of the data corresponding to the non-feature point areas of the workpiece surface and to determine a trigger level being, for example, parallel to the reference line based on the reference line. Therefore, according to the invention, it is possible to prevent easily the mistakes in distinguishing between the feature point areas and the non-feature point areas of the workpiece surface. Thereby, according to the invention, it becomes easy to determine accurately the coordinate values of the feature points of the data. Furthermore, according to the invention, it is possible to execute accurately origin setting since the origin of the workpiece coordinate system can be set after correcting the coordinate values of the feature points of the data using the correction value corresponding to the magnitude of this trigger level.

In the feature point selection step, the reference line indicating the direction of the non-feature point area of the workpiece surface is obtained based on the data of the non-feature point area in the data obtained in the input step. In the feature point selection step, the data exceeding the trigger level are obtained as coordinate values of the feature points. This trigger is provided in parallel to the reference line and separated by a predetermined distance in the direction perpendicular to the-reference line and is for determining, for example, that the stylus has moved crossing the boundary point between a non-feature point area and a feature point area of the workpiece surface.

In the origin setting step, it is preferable that, the coordinate values of the boundary point between a non-feature point area and a feature point area of the workpiece surface are estimated based on the coordinate values of the feature points obtained in the feature point selection step, the correction values of the stylus obtained in advance and the trigger level obtained in advance. It is preferable that, in the origin setting step, the origin of the workpiece coordinate system is set relative to an origin setting target point of the workpiece based on the coordinate values of the estimated boundary point.

Furthermore, according to the invention, it is preferable that, when the origin of the workpiece coordinate system is set relative to an origin setting target point other than a feature point on the workpiece surface, in the origin setting step, the origin of the workpiece coordinate system is set to the origin setting target point of the workpiece surface based on the coordinate values of the feature point obtained in the feature point selection step, the correction values of the stylus obtained in advance, the trigger level obtained in advance and the designed values of the workpiece obtained in advance.

(2) Inclined Line

Furthermore, according to the invention, it is preferable that, in the feature point selection step, the coordinate values of the feature points of the data are determined based on the point at which the angle formed by an inclined line within each very minute range of the data obtained in the input step and the reference line has exceeded a predetermined angle. This inclination can be obtained by statistically processing the data obtained in the input step.

As a result, according to the invention, it is possible to obtain the feature points of the data by obtaining the inclined line within each very minute range of the data obtained in the input step and by comparing each inclined lines with the reference line. Therefore, according to the invention, detection of the starting point of a feature point area such as the edge portion of a workpiece becomes easy and the above starting point can be set at a feature point.

Specifically, according to the invention, in the feature point selection step, the reference line indicating the direction of the non-feature points of the workpiece surface is obtained based on the data of the non-feature point areas in the data obtained in the input step. In the feature point selection step, the data obtained in the input step are divided into minute ranges and the inclined line for each of the minute ranges is obtained. In the feature point selection step, the representative points of the minute ranges for which a predetermined angle is exceeded are obtained as the coordinate values of the feature points of the data obtained in the input step by comparing the angle formed by the reference line with the inclined line.

In the origin setting step, it is preferable that the coordinate values of the boundary point between a feature point area and a non-feature point area of the workpiece surface are estimated based on the coordinate values of the feature points obtained in the feature point selection step and the correction value of the stylus obtained in advance. In the origin setting step, it is preferable that the origin of the workpiece coordinate system is set relative to an origin setting target point of the workpiece based on the coordinate values of the estimated boundary point.

Rate of Variation of Inclination Angle

Furthermore, according to the invention, in the feature point selection step, it is preferable that the coordinate values of the feature points of the data are determined based on the rate of variation of the inclination angle within each of the minute ranges of the data obtained in the input step.

(1) Where the Rate of Variation Is Large

Specifically, according to the invention, in the feature point selection step, it is preferable that the coordinate values of the feature points of the data obtained in the input step are determined based on the minute range for which the rate of variation of the inclination angle becomes more than a predetermined value or reaches the maximum.

More specifically, in the feature point selection step, the inclination angle of each of the minute ranges of the data obtained in the input step, against the direction of the driving axis or the direction of the detection axis of the stylus is obtained. In the feature point selection step, the rate of variation between the angles of inclination within each of the adjacent minute ranges is obtained and the representative points of the minute ranges for which this rate of variation becomes more than a predetermined value or reaches the maximum are obtained as the coordinate values of the feature points of the data.

In the origin setting step, it is preferable that the coordinate values of the boundary point between a non-feature point area and a feature point area of the workpiece surface are estimated based on the coordinate values of the feature points obtained in the feature point selection step and the correction value of the stylus obtained in advance. In the origin setting step, it is preferable that the origin of the workpiece coordinate system is set relative to an origin setting target point of the workpiece based on the coordinate values of the estimated boundary points.

As examples of "boundary point" referred to herein, a boundary point between a non-feature point area and a protrusion of the workpiece surface, a boundary point between a non-feature point area and a recess of the workpiece surface and an edge portion (a corner portion) of the workpiece surface can be listed.

(2) Where the Rate of Variation Is Small

Furthermore, according to the invention, it is preferable that, in the feature point selection step, the coordinate values of the feature points in the data obtained in the input step are determined based on the minute range for which the rate of variation of the inclination angle becomes less than a predetermined value or reaches the minimum.

Specifically, according to the invention, in the input step, data obtained by scanning over at least a protrusion of the workpiece with a stylus of a surface texture measuring machine are inputted.

In the feature point selection step, the inclination angle of each of the minute range of the data obtained in the input step, against the direction of driving axis or the direction of the detection axis of the stylus is obtained, and the rate of variation between the angles of inclination within each of the adjacent minute ranges is obtained. In the feature point selection step, the representative points of the minute ranges for which this rate of variation becomes less than a predetermined value or reaches the minimum are obtained as the coordinate values of the feature points of the data.

In the origin setting step, it is preferable that the coordinate values of the highest point of a protrusion of the workpiece surface are estimated based on the coordinate values of the feature points obtained in the feature point selection step and the correction value of the stylus obtained in advance. In the origin setting step, it is preferable that the origin of the workpiece coordinate system is set relative to an origin setting target point of the workpiece based on the estimated coordinate values of the highest point of the protrusion of the workpiece surface.

Furthermore, according to the invention, in the input step, data obtained by scanning over at least a recess of the workpiece surface with the stylus of the surface texture measuring machine are inputted.

In the feature point selection step, the inclination angle of each of the minute ranges of the data obtained in the input step, against the direction of driving axis or the direction of the detection axis of the stylus is obtained, and the rate of variation between the angles of inclination within each of the adjacent minute ranges is obtained. In the feature point selection step, the representative point of the minute range for which this rate of variation becomes less than a predetermined value or reaches the minimum is obtained as the coordinate values of the feature points of the data.

In the origin setting step, it is preferable that the coordinate values of the lowest point of the recess of the workpiece surface are estimated based on the coordinate values of the feature points obtained in the feature point selection step and the correction value of the stylus obtained in advance. In the origin setting step, it is preferable that the origin of the workpiece coordinate system is set relative to an origin setting target point of the workpiece based on the estimated coordinate values of the lowest point of the recess of the workpiece surface.

As described above, according to the invention, for example, the point for which the rate of variation of inclination angle of adjacent minute ranges reaches the maximum or such point for the minimal inclination angle can be extracted as a feature point. For example, in the case where the feature points are of a protrusion, the point for which the rate of variation of the inclination angle reaches the minimum is extracted as the highest point of the protrusion and this point can be determined as a feature point. Since the rate of variation of the inclination angle reaches the maximum at the point where the angle varies suddenly such as the edge portion of a workpiece, this point can be detected and determined as a feature point. Thereby, according to the invention, origin setting according to each respective workpiece can be executed securely and easily.

Sign of Inclination Angle

Furthermore, according to the invention, it is preferable that, in the feature point selection step, the coordinate values of feature points in the data obtained in the input step are determined based on the change of the sign attached to the inclination angle of each minute range of the data.

Specifically, according to the invention, in the input step, the data obtained by scanning over at least a protrusion of the workpiece surface with the stylus of the surface texture measuring machine are inputted.

In the feature point selection step, the inclination angle of each of the minute ranges of the data obtained in the input step, against the direction of the driving axis or the direction of the detection axis of the stylus is obtained. In the feature point selection step, the points at which the sign attached to the inclination angle changes from ascending to descending are obtained as the coordinate values of the feature points of the data.

In the origin setting step, it is preferable that the coordinate values of the highest point of a protrusion of the workpiece surface are estimated based on the coordinate values of the feature points obtained in the feature point selection step and the correction value of the stylus obtained in advance. In the origin setting step, it is preferable that the origin of the workpiece coordinate system is set relative to the origin setting target point of the workpiece based on the estimated coordinate values of the highest point of the protrusion of the workpiece surface.

Furthermore, according to the invention, in the input step, data obtained by scanning over at least a recess of the workpiece surface with the stylus of the surface texture measuring machine are inputted.

In the feature point selection step, the inclination angle of each of the minute range of the data obtained in the input step, against the direction of the driving axis or the direction of the detection axis of the stylus is obtained. In the feature point selection step, the coordinate values of the feature points of the data at which the sign attached to the inclination angle changes from descending to ascending are obtained.

In the origin setting step, it is preferable that the coordinate values of the lowest point of a recess of the workpiece surface are estimated based on the coordinate values of the feature points of the data obtained in the feature point selection step and the correction value of the stylus obtained in advance. In the origin setting step, it is preferable that the origin of the workpiece coordinate system is set relative to an origin setting target point of the workpiece based on the estimated coordinate values of the lowest point of the recess of the workpiece surface.

The Maximum and the Minimum

According to the invention, it is preferable that, in the feature point selection step, the coordinate values of the feature points of the data obtained in the input step are determined based on the maximum or the minimum of the data.

Consequently, according to the invention, since the highest points of the protrusions or the lowest point of the recesses can be easily detected, it is easy to extract them as the feature points of the data.

(1) The Maximum

Specifically, according to the invention, in the input step, data obtained by scanning over at least a protrusion of the workpiece surface with the stylus of the surface texture measuring machine are inputted.

In the feature point selection step, the coordinate values of a feature point being the maximum of the data obtained in the input step are obtained.

In the origin setting step, it is preferable that the coordinate values of the highest point of the protrusion of the workpiece surface are estimated based on the coordinate values of the feature points of the data obtained in the feature point selection step and the correction value of the stylus obtained in advance. In the origin setting step, it is preferable that the origin of the workpiece coordinate system is set relative to an origin setting target point of the workpiece based on the estimated coordinate values of the highest point of the protrusion of the workpiece surface.

(2) The Minimum

Furthermore, according to the invention, in the input step, data obtained by scanning over at least a recess of the workpiece surface with the stylus of the surface texture measuring machine are inputted.

In the feature point selection step, it is preferable that the coordinate values of a feature point being the minimum of the data obtained in the input step are obtained.

In the origin setting step, it is preferable that the coordinate values of the lowest point of the recess of the workpiece surface are estimated based on the coordinate values of the feature points of the data obtained in the feature point selection step and the correction value of the stylus obtained in advance. In the origin setting step, it is preferable that the origin of the workpiece coordinate system is set relative to an origin setting target point of the workpiece based on the estimated coordinate values of the lowest point of the recess of the workpiece surface.

Origin Setting Program

Furthermore, in order to achieve the above object, a workpiece coordinate system origin setting program of a surface texture measuring machine according to the invention is wherein the program causes a computer to execute a workpiece coordinate system origin setting method of a surface texture measuring machine of the invention.

Consequently, according to the invention, even a cheap computer can quickly and easily execute the origin setting of a workpiece coordinate system of a surface texture measuring machine.

Origin Setting Device

Furthermore, in order to achieve the above object, a workpiece coordinate system origin setting device of a surface texture measuring machine comprises a data inputter, a feature point selector and an origin setter.

Here, the data inputter inputs data collected by scanning over at least a feature area including feature point areas and non-feature point areas of the workpiece surface with a detector of the surface texture measuring machine measuring the surface texture by scanning the workpiece surface.

The feature point selector extracts the coordinate values of feature points of the data obtained by the data inputter by statistically processing the data.

The origin setter sets the origin of the workpiece coordinate system relative to an origin setting target point of the workpiece based on the coordinate values of the feature points of the data obtained by the feature point selector.

Consequently, according to the invention, it is possible to execute the origin setting at a low cost and quickly since the feature points can be extracted with the simple feature points selector applying a statistical processing. Here, according to the invention, it is possible to set the origin of the workpiece coordinate system by extracting the feature points in real time while scanning over the workpiece surface. Thereby, according to the invention, the preparation of the measurement can be conducted further quicker.

BEST MODE FOR CARRYING OUT THE INVENTION

Figure 1:
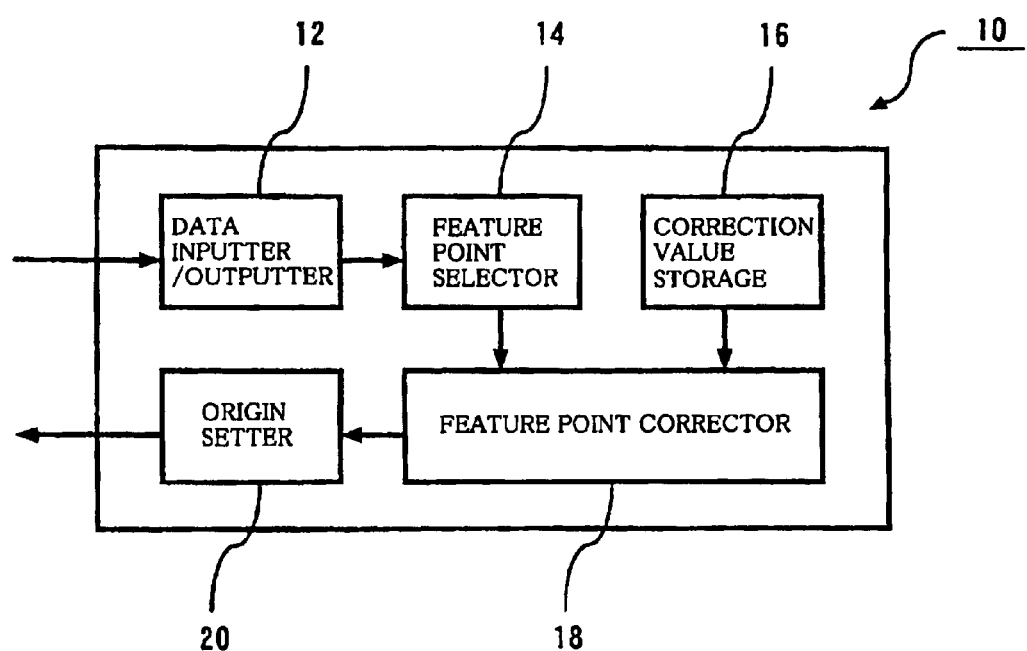
FIG. 1 is a block diagram of an origin setting device of a surface texture measuring machine according to an embodiment of the invention.

Now, preferable embodiments of the invention will be described referring to the drawings.

FIG. 1 shows a schematic structure of an origin setting device of a surface texture measuring machine according to a first embodiment of the invention.

The origin setting device 10 of the surface texture measuring machine shown in FIG. 1 comprises, for example, a computer and includes a data inputter/outputter (inputter) 12, a feature point selector 14, a correction value storage 16, a feature point corrector 18 and an origin setter 20.

The origin setting device 10 may be structured as an independent machine and may be combined with a conventional surface texture measuring machine. Furthermore, the origin setting device 10 may be built-in type and may be integrated in a surface texture measuring machine. In either case, the data inputter/outputter 12 inputs the data in the detection-axis direction (Z-axis data) detected by a stylus and scanning position data in the workpiece surface direction (driving-axis direction) (X-axis data) when the stylus of a surface texture measuring machine is caused to scan relatively to the direction of the workpiece surface. A scale provided to a stylus scanning mechanism of the surface texture measuring machine is used for the detection of this scanning position. Information on the origin set by the origin setter 20 is outputted to the surface texture measuring machine and used for origin setting of the workpiece coordinate system that the surface texture measuring machine provides as its own system.

Here, as the data inputted to the data inputter/outputter 12, the data based on a machine coordinate system determined by a specific origin that the surface texture measuring machine has are used. For example, the origin of a scale provided to the stylus scanning mechanism of the surface texture measuring machine is determined uniquely by incorporation of the scale at the manufacturing stage. Consequently, a machine coordinate system based on this origin is set. The origin of the machine coordinate system of the stylus is regarded as the electric zero (0) point of the detection output of the stylus.

The Z-axis data are inputted together with the X-axis data, to the data inputter/outputter 12 as feature area data (data). This surface texture data are obtained by scanning with, for example, contacting ball Q over a line area including feature portions such as a workpiece edge, by, for example, a roundness measuring machine. The data obtained in this manner are stored in a memory (not shown) of the data inputter/outputter 12.

The data inputter/outputter 12 comprises a predetermined area removing unit and a singular point removing unit (both are not shown). Here, the predetermined area removing unit deletes predetermined area data not necessary for the statistical processing in the feature point selection step, from the feature area data. The singular point removing unit removes singular point data.

The feature point selector 14 reads out the feature area data stored in the storage and extracts feature points by applying a statistical processing to the feature area data having been read out. The statistical processing executed here is a statistical processing capable of being processed at a high speed such as extraction of feature points to be the maximum or the minimum of the data, comparison of magnitudes of the data and a predetermined trigger level, calculation of the reference line for the line portion (non-feature point area) of the data, and calculation of inclination angles in minute ranges of the data. The feature point selector 14 extracts most suitable feature points based on the result of this statistical processing.

The feature point corrector 18 corrects the coordinate values of the feature points obtained by the feature point selector 14 using a correction value stored in the correction value storage 16. This correction value is, for example, an offset based on the radius of the contacting ball Q of the stylus S or a correction value attributed to shape errors. This correction value is stored in the correction value storage 16 in advance. The feature point corrector 18 corrects the coordinate values of the feature points obtained by the feature point selector 14 based on the correction value (a correction value for the stylus) stored in the correction value storage 16. Thereby, the feature point corrector 18 can correct errors attributed to the shape of the tip of the contacting ball Q of the stylus S.

The origin setter 20 sets the origin of the workpiece coordinate system based on the coordinate values of the feature points of the feature area data corrected by the feature point corrector 18. More specifically, the origin setter 20 outputs the origin setting information for forming a new workpiece coordinate system having its origin (usually a zero (0) point) at the position of a corrected feature point in the machine coordinate system. The surface texture measuring machine forms a new workpiece coordinate system based on the origin setting information outputted by the origin setter 20.

For example, in the case of a roundness measuring machine, the origin of the workpiece coordinate system is set at, for example, the central position O of the lower face, the central position of the upper face or an edge $W_e$ of a column-shaped workpiece. The origin position can be selected freely for each workpiece.

The origin setting device 10 of the surface texture measuring machine according to the embodiment is structured schematically as above.

The workpiece coordinate system origin setting of the invention may be executed using this origin setting device 10 as well as it may be executed by causing a computer program to execute a predetermined process procedure.

Figure 2:
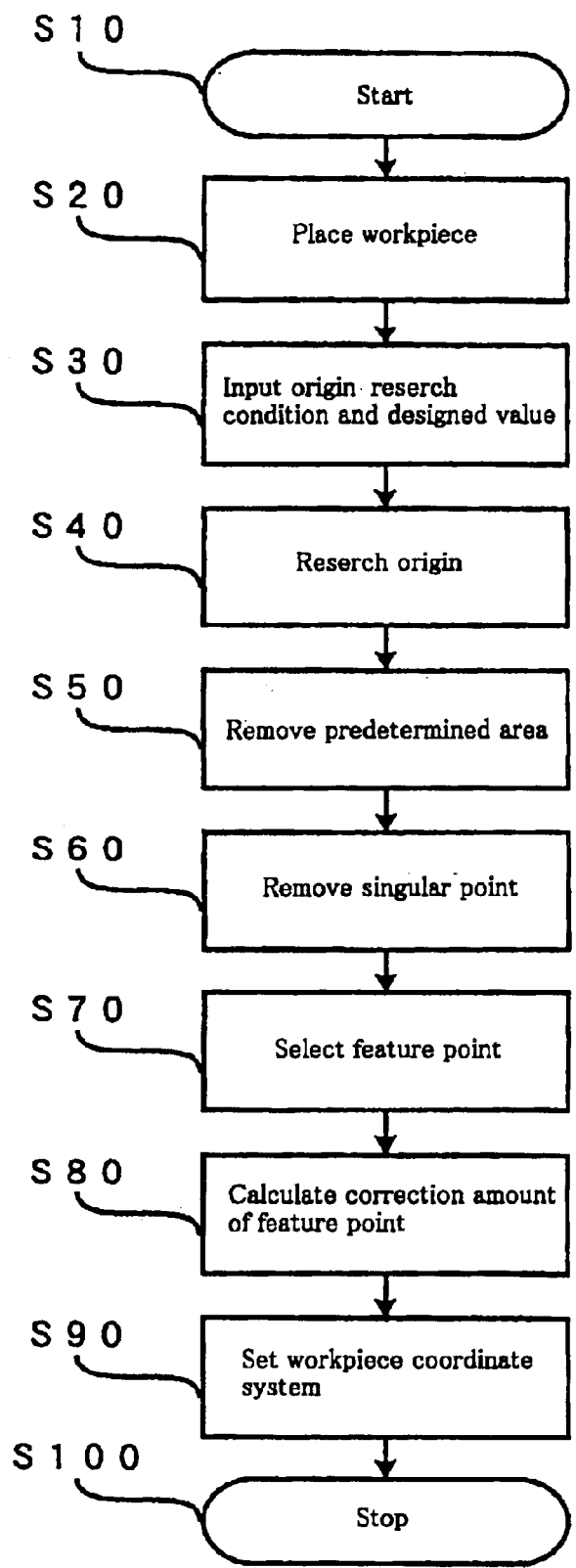
FIG. 2 is a flowchart showing an origin setting method of the surface texture measuring machine according to the embodiment of the invention.

FIG. 2 is a flowchart showing one embodiment of the origin setting method of the surface texture measuring machine.

In this embodiment, the case where the origin of a workpiece coordinate system of a column-shaped workpiece for a roundness measuring machine is set will be described.

For the convenience of description, it is assumed that the direction of the central axis of the workpiece is Z-axis and the direction perpendicular to the direction of the central axis of the workpiece is X-axis. It is assumed that the workpiece is placed in the roundness measuring machine such that the central axis of the workpiece is in the vertical direction. The feature area data refers to those used when the stylus S is scanned in the X-axis direction (the horizontal direction) on the upper face of the workpiece, feature points on the data corresponding to the workpiece edge portion $W_e$ (the intersections of the upper face and the column outer circumferential side) are extracted. The workpiece coordinate system origin is set relative to the edge portion of the workpiece surface based on the coordinate values of the feature points on the extracted data. In addition, the workpiece edge portion can be detected by scanning over the column outer side in the direction toward the workpiece edge portion $W_e$.

First, an origin setting process is started in Step 10 (S10).

Next, in a workpiece placing step (S20), a workpiece is placed on a rotation table of a roundness measuring machine. Here, the posture of the workpiece is adjusted such that the central axis of the workpiece is aligned on the rotation axis of the rotation table.

Then, in an origin search condition/designed value input step (S30), origin search conditions, designed values of the workpiece (the radius $X_d$, the length $Z_d$), the radius r of the contacting ball Q of the stylus (correction value for the stylus), areas to be removed such as areas not necessary for a statistical processing in the feature point selection step are inputted.

As the origin search conditions, the starting point, the edge point and the velocity of the scanning over the workpiece surface (origin search) by the stylus S are listed as examples. Here, prior to the origin search, the contacting ball Q is caused to contact with the upper face (an end of the workpiece axis) of the workpiece W, and an origin search distance (the distance in the X-axis direction) exceeding the workpiece edge portion $W_e$ from the contacting point as the starting point and origin search velocity are inputted. In addition, the case where the detected Z-axis value of the stylus has exceeded a predetermined limit value is a condition to stop the origin search.

<Input Step>

Based on these conditions, in an origin search step (S40), an origin search is executed and feature area data are inputted. The Z-axis data and the X-axis data inputted in this step are internally stored in the storage of the data inputter/outputter 12.

Predetermined Area Removing Step

Figure 5:
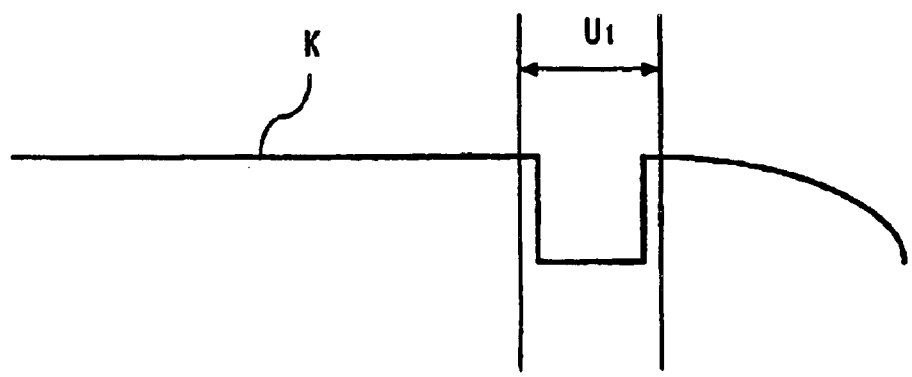
FIG. 5 is a diagram illustrating a data input step in an origin setting method.

In the case where the data of a predetermined area are set to be removed from the feature area data in a predetermined area removing step (S50), predetermined areas not necessary for a statistical processing in the feature point selection step are removed. For example, in the predetermined area removing step (S50), when an area $U_1$ in the scanning locus K shown in FIG. 5 is a recess, the data of this area $U_1$ is removed. Designation of this area $U_1$ may be set in advance. In addition, this area $U_1$ may be designated for each case based on the result of the scanning locus K displayed on the screen.

Singular Point Removing Step

Following the predetermined area removing step (S50), singular points are removed in the singular point removing step (S60).

A "singular point" refers to a protruded point in the scanning locus (feature area data). Such points are attributed to electric noises or dusts on the workpiece surface and are removed in the singular point removing step (S60) since they give adverse effect to the statistical processing.

Figure 6:
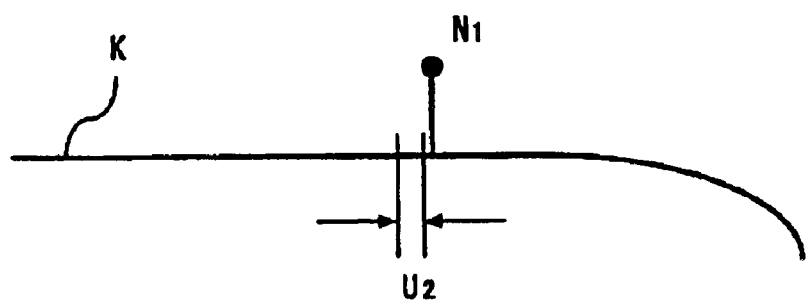
FIG. 6 is another diagram illustrating the data input step in the origin setting method.

For example, in the singular point removing step (S60), when a singular point $N_1$ is included in the scanning locus K (feature area data) shown in FIG. 6 and the distance between the Z-axis-average value (the average of Z-axis data) of a minute range $U_2$ immediately before the point and the Z-axis value (Z-axis data) of the point $N_1$ is more than a predetermined value, this point $N_1$ is determined as a singular point and is deleted.

Figure 7:
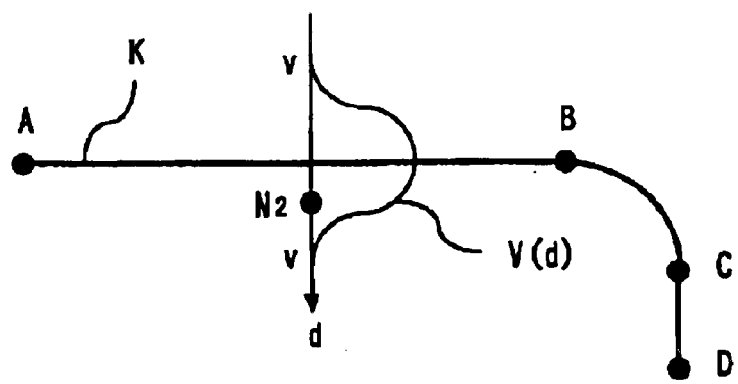
FIG. 7 is yet another diagram illustrating the data input step in the origin setting method.

It is preferable that robust estimation is used as a method for securely removing singular points. That is, in the singular point removing step (S60), for example, removing of the singular point data in a line portion AB (non-feature point area) of the feature area data is processed according to the following procedure (see FIG. 7).

(1) Parameters a, b and c of a line ax+by+c=0 are derived by the standard least-squares method using the data of the line portion AB (non-feature point area) of the feature area data.

(2) Each data is weighted. That is, for the obtained line, a weight function V(d) is considered in the direction perpendicular to the above line. V(d) is calculated based on a distance d having a sign from the line and the V(d) is determined as the weight of the data. Examples of the weight function V(d) are as follows.

Where the absolute value of the distance d>the standard deviation v, V(d)=0.

Where the absolute value of the distance d≦the standard deviation v, $V(d)=(1-(d/v)^2)^2$.

The calculated weight is a scale for determining the line how much the data is emphasized. For example, as the value of the calculated weight becomes larger, the data is considered to be more important.

(3) After weighting each data as described above, the line is again obtained by the weighted least-squares method.

That is, taking into account the weight attached to each of the data, the line is again obtained using the weighted least-squares method. Thereby, the data closer to the line obtained first contributes more to the calculation of the line and the data farther from the line contributes less to obtaining the line. Therefore, the probability that a valid line can be obtained can be increased.

(4) Here, a line with accuracy not yet sufficient has been obtained when a process for obtaining the line is executed for only once. Therefore, the line obtained in the last process and the line obtained in the present process are compared to each other and whether or not there is a large difference between them is checked. That is, when there is no large difference, the obtained line is determined to be a fitting element. In contrast, when there is a large difference, each data is weighted and re-obtaining of the line by the weighted least-squares method is repeated.

(5) For the determined fitting element (a line), again, the data for which V(d)=0, is established as singular point data using the weight function V(d) and is removed from the feature area data.

In other words, since the weight of singular point data becomes almost zero (0) from the result of such robust fitting, estimation and removal of the singular point data can be executed easily.

That is, for the singular point data extremely separated from the geometrical elements, the result of the fitting calculation is adversely influenced when the standard least-squares method is applied. In contrast, according to the invention, since the robust estimation is used, the extent to which the result of the fitting calculation is adversely influenced by the data extremely separated from the geometrical elements can be significantly decreased.

Similarly, when geometrical elements other than lines are obtained, they can be obtained with the same algorithm. For example, even in the case for an arc area BC, the geometrical elements can be obtained by giving a weight function V(d) in the direction perpendicular to its tangent line.

The steps of the above origin search step (S40), the predetermined area removing step (S50) and the singular point removing step (S60) constitute the input step of the invention. Each step of this input step is executed by the data inputter/outputter 12.

<Feature Point Selection Step>

Next, the feature point selector 14 executes a feature point selection step (S70). In the feature point selection step (S70), feature points are extracted from the feature area data (scanning locus K).

Various methods may be used as a method for extracting feature points. For the invention, two (2) embodiments described as follows will be described.

Reference Line

Figure 3A:
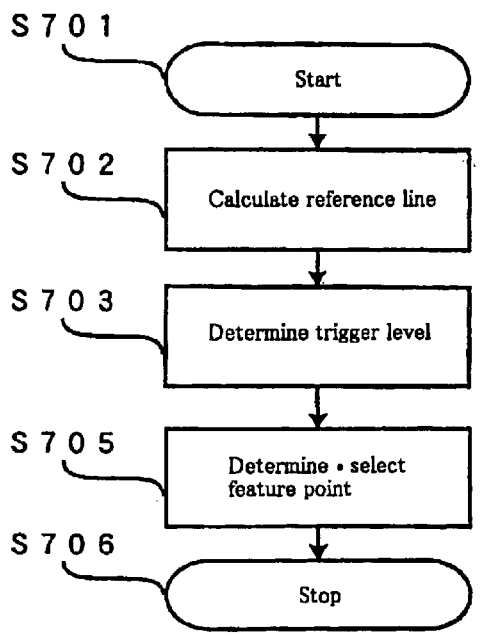
FIGS. 3 are flowcharts showing a first embodiment of the origin setting method of the surface texture measuring machine according to the invention.
Figure 3B:
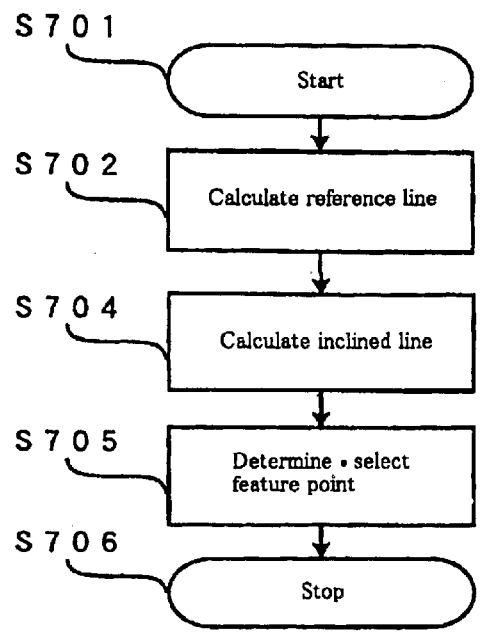

FIGS. 3 show flowcharts of a first embodiment of this feature point selection step (S70). FIG. 3 (A) shows the case where feature points of data are extracted based on a trigger level and FIG. 3 (B) shows the case where feature points of data are extracted based on inclination angles of the scanning locus.

The feature point selection step is started with Step 701 (S701).

Figure 8:
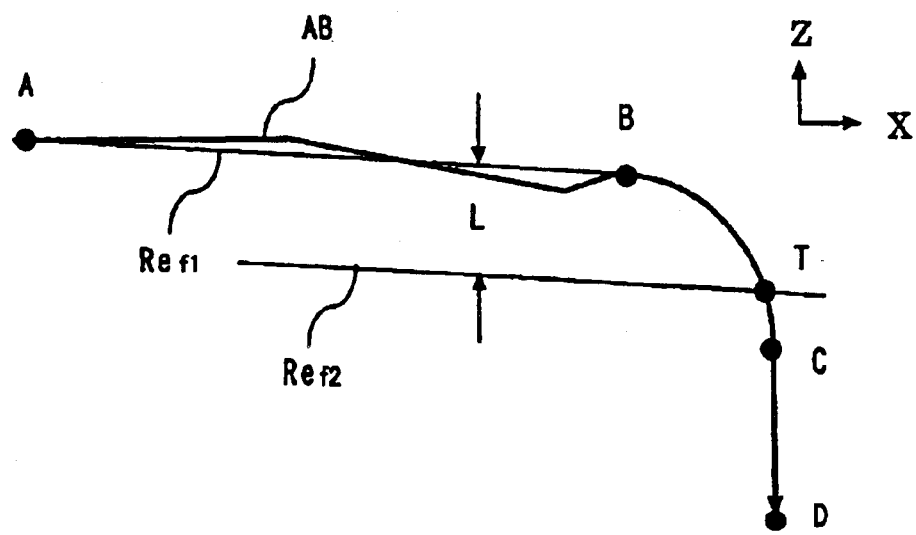
FIG. 8 is a diagram illustrating a line portion extraction method according to the origin setting method.

That is, when the surface of the workpiece W is inclined against the X-axis or the Z-axis, or when the surface of the workpiece W includes waving, a reference line $Re_{f1}$ is calculated in a reference line calculation step (S702) (see FIG. 8). This reference line $Re_{f1}$ can be easily calculated by applying the least-square method etc. to the data of the line portion AB (non-feature point area) of the feature area data. However, at this stage, the line portion is extracted, for example, as follows since the position of the point B is not known.

(1) A first reference line is obtained by the least-squares method based on the data of the specific area with point A as the starting point.

(2) If the dispersion (standard deviation) for this specific area is within a predetermined value, the specific area is extended and (1) is executed again.

(3) If the dispersion (standard deviation) for this specific area exceeds the predetermined value, the specific area immediately before this is determined to be a line portion (non-feature point area).

On the other hand, If the inclination of the surface of the workpiece W against the X-axis or the Z-axis can be neglected, a line parallel to the X-axis or the Z-axis including the origin search starting point may be regarded as the reference lien $Re_{f1}$.

(1) Trigger Level

Here, when a feature point of the data is extracted based on a predetermined trigger level for the reference line $Re_{f1}$ obtained as described above, as shown in FIG. 3 (A), a trigger level determination step (S703) is executed after the reference line calculation step (S702).

That is, in the trigger level determination step (S703), a trigger level $Re_{f2}$ being parallel to the reference line $Re_{f1}$ and separated by a predetermined distance L is determined (see FIG. 8).

Following the trigger level determination step (S703), a feature point determination/selection step (S705) is executed.

That is, in the feature point determination/selection step (S705), a point T for which the feature area data has exceeded the trigger level $Re_{f2}$ is determined to be a feature point of the feature area data and is extracted (see FIG. 8).

As described above, in the feature point selection step, a reference line indicating a statistical plane direction of the workpiece surface against the X-axis direction is obtained based on the data of a line portion (non-feature point area) of the scanning locus K (data) corresponding to the non-feature point area of the workpiece surface obtained in the input step. The trigger level is provided being in parallel to this reference line and separated by a predetermined distance in the direction perpendicular to the reference line.

Thus, when the scanning locus K (data) of the stylus has exceeded the boundary point between the line AB and the curve BC on the scanning locus K and moves downward more, it exceeds the trigger level. In the feature point selection step, it is securely determined that the scanning locus K has exceeded the boundary point between the line AB and the curve BC on the scanning locus K by detecting a point on the scanning locus K, that has exceeded the trigger level.

It is preferable to use a step in which a feature point of the data is extracted based on the trigger level as described above, when the origin of a workpiece coordinate system is set for a workpiece of which the surface direction is inclined against the X-axis or the Z-axis, or a workpiece of which the surface includes waviness.

In this case, it is preferable to execute an input step and an origin setting step described as follows together with the feature point selection step.

That is, in the input step, feature area data obtained by scanning over a non-feature point area and a feature point area adjacent to each other of the workpiece surface are inputted.

In the origin setting step, the coordinate values of an origin setting target point of the workpiece surface are estimated based on the coordinate values (X-axis data, Z-axis data) of feature points on the scanning locus K (data) obtained in the feature point selection step, a correction value of the stylus obtained in advance and the trigger level L obtained in advance. As the coordinate values of an origin setting target point, for example, the coordinate values of an edge portion of the workpiece, the center of the upper face of a column-shaped workpiece and the center of the lower face of a column-shaped workpiece are listed as examples. In the origin setting step, the origin of a workpiece coordinate system is set relative to an origin setting target point of the workpiece, for which the coordinate values have been estimated as described above.

Furthermore, for the above structure, when the angle of an edge portion of a workpiece surface etc. is known such as 90°, in the case where the angle formed by the line AB and the line CD of the scanning locus K is, for example, 90°, it is sufficient that a reference line for the line AB or a reference line for the line CD against the X-axis or the Z-axis is obtained. On the other hand, when the angle of an edge portion of a workpiece surface is not known, it is more preferable to obtain reference lines for the line AB and the line CD.

(2) Inclined Line

On the other hand, when feature points are extracted using the inclination angle of the scanning locus K, as shown in FIG. 3 (B), an inclined line calculation step (S704) is executed after the reference line calculation step (S702).

That is, in the inclined line calculation step (S704), the feature area data is divided into minute ranges and the inclined line for each minute range is calculated.

Here, the minute ranges may not always be divided fixedly and each of them may be moved overlapping each other one by one, similarly to the case where the moving average is obtained. For example, an area corresponding to the first datum to the fourth datum of the feature area data may be considered to be the first minute range and the second datum to the fifth datum of the same feature area data may be considered to be the second minute range. An inclined line can also be calculated easily based on the coordinate values of the starting point of a minute range and the coordinate values of the end point of the minute range.

Following the inclined line calculation step (S704), a feature point determination/selection step (705) in which feature points of the data are determined and extracted is executed.

Figure 9:
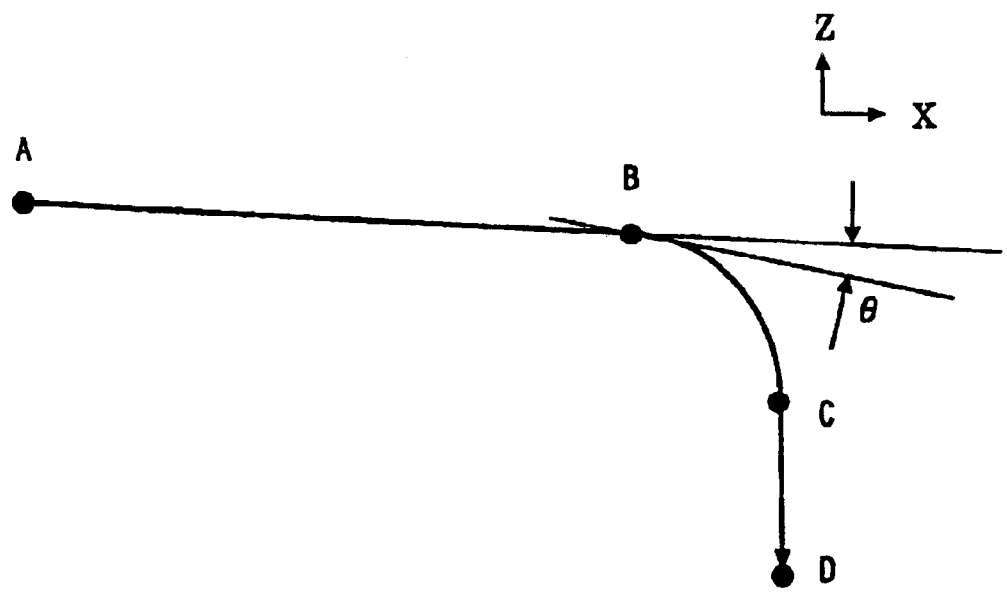
FIG. 9 is a diagram illustrating an inclination angle determining method according to the origin setting method.

That is, when the feature points of the data are extracted using inclined lines of the scanning locus K, in feature point determination/selection step (S705), angles formed by the reference line $Re_{f1}$ and the inclined line of each minute range are compared with a predetermined angle and, the representative points of the minute ranges exceeding the predetermined angle (the points having the coordinate values closest to the average value of each point in a minute range) is determined to be the feature point of the data and is extracted (see FIG. 9).

According to the first embodiment of feature point extraction, the process is finished at Step (S706) and the process is transferred to a feature point correction amount calculation step (S80) shown in FIG. 2.

By the step in which feature points of the data are extracted based on the inclination angle of the scanning locus K as described above, for example, the starting point (the boundary point between a non-feature point area and a feature point area) of a feature point area of the data may be extracted as the feature points of the data.

In this case, it is preferable that an input step and an origin setting step described as follows are executed together with the feature point selection step.

That is, in the input step, feature area data obtained by scanning over a non-feature point area and a feature point area adjacent to each other of the workpiece surface are inputted.

In the origin setting step, the coordinate values of the starting point of a feature point area of the workpiece surface are estimated based on the coordinate values (X-axis data, Z-axis data) of the representative point obtained in the feature point selection step and a correction value of the stylus obtained in advance. In the origin setting step, the origin of the workpiece coordinate system is set relative to the origin setting target point of the workpiece W based on the coordinate values of the starting points of the feature point areas of the workpiece surface estimated as above.

Figure 4A:
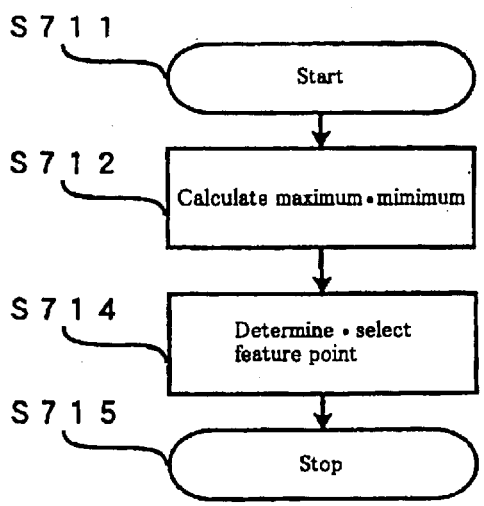
FIGS. 4 are flowcharts showing a second embodiment of the origin setting method of the surface texture measuring machine according to the invention.
Figure 4B:
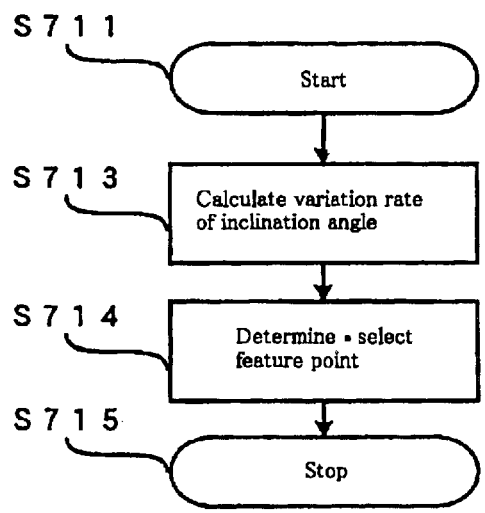

Next, FIGS. 4 show flowcharts of a second embodiment of the feature point selection step. FIG. 4 (A) shows the case where feature points of the data are determined based on the maximum or the minimum of the data and FIG. 3 (B) shows the case where feature points of the data are determined based on the rate of variation of inclination angles of the minute ranges of the data.

The Maximum and the Minimum

First, the process is started with Step 711 (S711).

As shown in FIG. 4 (A), when the feature points of the feature area data are determined based on the maximum or the minimum of the feature area data, the points at which the Z-axis data of the feature area data becomes the maximum or the minimum are calculated in a maximum/minimum calculation step (S712).

Following the maximum/minimum calculation step (S712), feature points are extracted and determined in a feature point determination/selection step (S714).

That is, in the feature point determination/selection step (S714), the points at which the Z-axis data becomes the maximum or the minimum, obtained in the maximum/minimum calculation step (S712) are determined to be the feature points of the data and are extracted.

(1) The Maximum

Figure 10A:
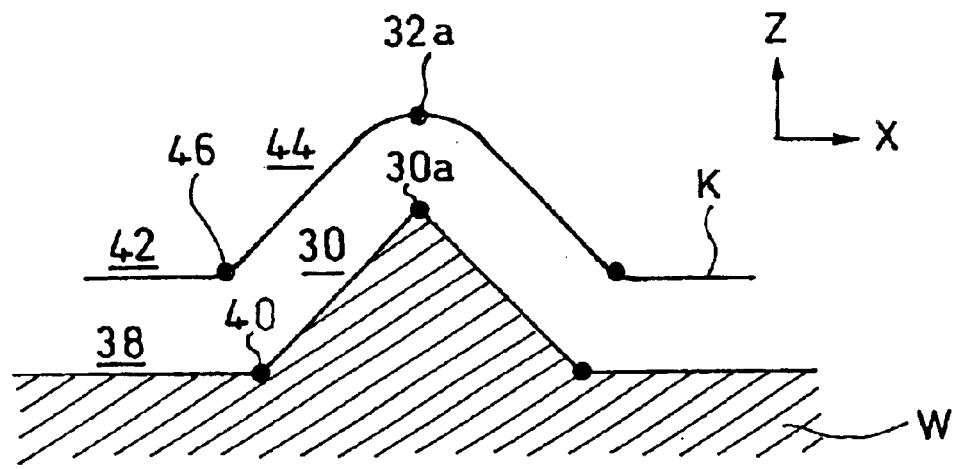
FIGS. 10 are diagrams illustrating a feature point determining method according to the origin setting method.
Figure 10B:
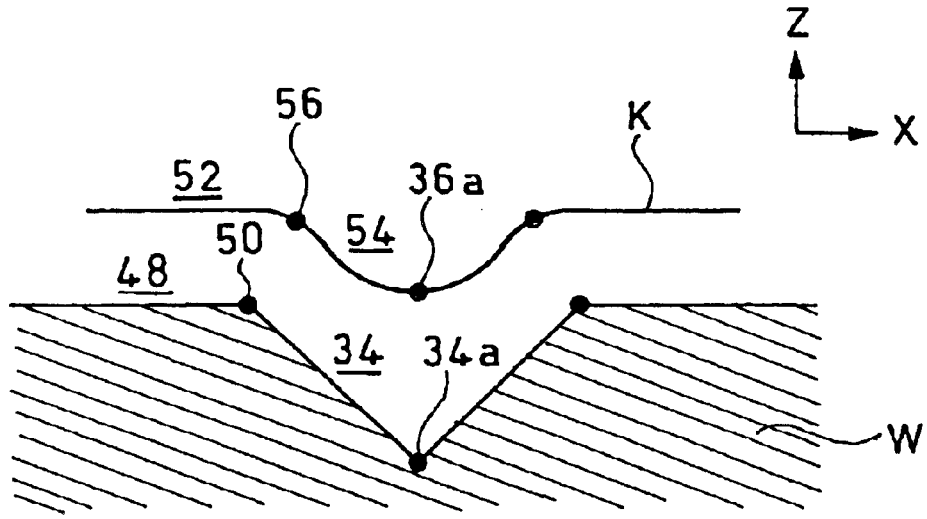

It is preferable that the step for extracting the feature points based on the maximum of the Z-axis data as described above is used for the case where, for example, a protrusion 30 is formed on the workpiece W as shown in FIG. 10 (A) and the origin of the workpiece coordinate system is set based on the coordinate values of a highest point 30a of the protrusion 30 of the workpiece W.

In this case, it is preferable to execute an input step and an origin setting step described as follows together with the feature point selection step.

That is, in the input step, feature area data obtained by scanning over at least the protrusion 30 of the workpiece W are inputted.

In the feature point selection step, the coordinate values of the feature point at which the Z-axis data of the feature area data obtained in the input step becomes the maximum are obtained. In other words, in the feature point selection step, a feature point 32a at which the Z-axis data of the scanning locus K becomes the maximum is obtained.

In the origin setting step, the coordinate values (X-axis data, Z-axis data) of the highest point 30a of the protrusion 30 of the workpiece W is estimated based on the coordinate values of the feature point 32a of the feature area data (scanning locus K) obtained in the feature point selection step and the correction value of the stylus obtained in advance. In the origin setting step, the origin of the workpiece coordinate system is set relative to an origin setting target point of the workpiece W based on the coordinate values of the highest point 30a of the protrusion 30 of the workpiece W estimated as above. Consequently, in the origin setting step, the origin of the workpiece coordinate system may be set relative to the highest point 30a of the protrusion 30 of the workpiece W. Furthermore, by using information such as the designed values of the workpiece, the origin of the workpiece coordinate system may be set relative to an origin setting target points of the workpiece other than the highest point 30a of the protrusion 30 (for example, the center of the workpiece and an edge portion of the workpiece).

(2) The Minimum

It is preferable that the step for extracting the feature points based on the minimum of the Z-axis data of the feature area data as described above is used for the case where, for example, a recess 34 is formed on the workpiece W as shown in FIG. 10 (B) and the origin of the workpiece coordinate system is set based on the coordinate values of a lowest point 34a of the recess 34 of the workpiece W.

In this case, it is preferable to execute an input step and an origin setting step described as follows are executed together with the feature point selection step.

That is, in the input step, feature area data obtained by scanning over at least the recess 34 of the workpiece W with the stylus of the surface texture measuring machine are inputted.

In the feature point selection step, the coordinate values (X-axis data, Z-axis data) of the feature point at which the Z-axis data of the feature area data obtained in the input step becomes the minimum are obtained. In other words, in the feature point selection step, a feature point 36a at which the Z-axis data of the scanning locus K becomes the minimum is obtained.

In the origin setting step, the coordinate values of the lowest point 34a of the recess 34 of the workpiece W is estimated based on the coordinate values of the feature point 36a of the feature area data (scanning locus K) obtained in the feature point selection step and the correction value of the stylus obtained in advance. In the origin setting step, the origin of the workpiece coordinate system is set relative to an origin setting target point of the workpiece W based on the coordinate values of the lowest point 34a of the recess 34 of the workpiece W estimated as above. For example, in the origin setting step, the origin of the workpiece coordinate system may be set relative to the lowest point 34a of the recess 34 of the workpiece W. Furthermore, by using the designed values of the workpiece, the origin of the workpiece coordinate system may also be set relative to an origin setting target points of the workpiece other than the lowest point 34a of the recess 34 (for example, the center of the workpiece and an edge portion of the workpiece).

Rate of Variation of Inclination Angle

On the other hand, as shown in FIG. 4 (B), when a feature point is determined based on the rate of variation of inclination angle of the minute ranges of the data, in a inclination angle variation rate calculation step (S713), the inclination angle of each minute range is calculated and, from the result of this, the variation rate of each inclination angle is calculated. This inclination angle of each minute range may be obtained by calculating the inclination of the inclined line against the X-axis, using the same process procedure as the inclined line calculation step (S704) as shown in FIG. 3 (B). After calculating the inclination angle of each of the minute range, for example, the rate of variation between the inclination angles of each of adjacent minute ranges is obtained.

After the inclination angle variation rate calculation step (S713), a feature point determination/selection step (S714) is executed.

That is, in the feature point determination/selection step (S714), the representative points of the minute ranges at which the rate of variation calculated in the inclination angle variation rate calculation step (S713) becomes more than a predetermined value or reaches the maximum are determined as the feature points and are extracted. Otherwise, in the feature point determination/selection step (S714), the representative points of the minute ranges at which the rate of variation becomes less than a predetermined value or reaches the minimum are determined as the feature points and are extracted.

Here, as a point at which the rate of variation of the inclination angle becomes less than a predetermined value or reaches the minimum, specifically, a point in the vicinity of the highest point of a protrusion and a point in the vicinity of the lowest point of a recess may be listed. As a point at which the rate of variation of the inclination angle becomes more than a predetermined value or reaches the maximum, a point in the vicinity of the boundary point between a line portion (non-feature point area) and a protrusion of a workpiece, a point in the vicinity of the boundary point between a line portion and a recess of a workpiece, and an edge portion of a workpiece may be listed.

(1) The Rate of Variation Is Large (The Boundary Point to a Protrusion)

It is preferable that the step for extracting the feature points of the data based on the representative points of the minute ranges at which the rate of variation of the inclination angle is large as described above are used for the case where, for example, a line portion (non-feature point area) 38 and a protrusion (feature point area) 30 are formed on the surface of the workpiece W as shown in FIG. 10 (A) and the origin of the workpiece coordinate system is set based on the coordinate values of a boundary point 40 between this line portion 38 and the protrusion 30.

In this case, it is preferable to execute an input step and an origin setting step described as follows are executed together with the feature point selection step.

That is, in the input step, feature area data obtained by scanning over the line portion 38 and the protrusion 40 of the workpiece W are inputted.

In the feature point selection step, the inclination angle of a minute range of the scanning locus K (feature area data) against the X-axis direction is obtained and the rate of variation between the inclination angle of each minute range adjacent to each other is obtained. In the feature point selection step, the coordinate values of the representative point of the minute range at which the rate of variation becomes more than a predetermined value or reaches the maximum are obtained. Consequently, in the feature point selection step, the coordinate values (X-axis data, Z-axis data) of the boundary point 46 between the line portion 42 and the protrusion 44 of the scanning locus K (data) can be obtained.

In the origin setting step, the coordinate values of the boundary point 40 between the line portion 38 and the protrusion 30 of the workpiece W is estimated based on the coordinate values of the boundary point 46 between the line portion 42 and the protrusion 44 of the scanning locus K (data) obtained in the feature point selection step and the correction value of the stylus obtained in advance. In the origin setting step, the origin of the workpiece coordinate system can be set relative to an origin setting target point of the workpiece W based on the coordinate values of the boundary point 40 between the line portion 38 and the protrusion 30 of the workpiece W estimated as above.

(2) The Rate of Change Is Large (The Boundary Point to a Recess)

It is also preferable that the step for extracting the feature points based on the representative points of the minute ranges at which the rate of variation of the inclination angle is large as described above is used for the case where, for example, a line portion (non-feature point area) 48 and a recess (feature point area) 34 are formed on the surface of the workpiece W as shown in FIG. 10 (B) and the origin of the workpiece coordinate system is set based on the coordinate values of a boundary point 50 between the line portion 48 and the recess 34 of this workpiece W.

In this case, it is preferable to execute an input step and an origin setting step described as follows are executed together with the feature point selection step.

That is, in the input step, feature area data obtained by scanning over the line portion 48 and the recess 34 of the workpiece W are inputted.

In the feature point selection step, the inclination angle of a minute range of the feature area data against the X-axis direction is obtained and the rate of variation between the inclination angle of each minute range adjacent to each other is obtained. In the feature point selection step, the coordinate values of the representative point of the minute range at which the rate of variation becomes more than a predetermined value or reaches the maximum are obtained. Consequently, in the feature point selection step, the coordinate values (X-axis data, Z-axis data) of the boundary point 56 between the line portion 52 and the recess 54 of the scanning locus K (data) can be obtained.

In the origin setting step, the coordinate values of the boundary point 50 between the line portion 48 and the recess 34 of the workpiece W are estimated based on the coordinate values of the boundary point 56 between the line portion 52 and the recess 54 of the data obtained in the feature point selection step and the correction value of the stylus obtained in advance. In the origin setting step, the origin of the workpiece coordinate system is set relative to an origin setting target point of the workpiece W based on the coordinate values of the boundary point 50 between the line portion 48 and the recess 34 of the workpiece W estimated as above.

(3) The Rate of Change Is Small (The Highest Point of a Protrusion)

It is also preferable that the step for extracting the feature points based on the representative points of the minute ranges at which the rate of variation of the inclination angle is small as described above is used for the case where, for example, the protrusion 30 is formed on the surface of the workpiece W as shown in FIG. 10 (A) and the origin of the workpiece coordinate system is set based on the coordinate values of the highest point 30a of the protrusion 30 of the workpiece W.

In this case, it is preferable to execute an input step and an origin setting step described as follows are executed together with the feature point selection step.

That is, in the input step, feature area data obtained by scanning over at least the protrusion 30 of the workpiece W with the stylus of the surface texture measuring machine are inputted.

In the feature point selection step, the inclination angle of each minute range of the feature area data against the X-axis direction is obtained and the rate of variation between the inclination angle of each minute range adjacent to each other is obtained. In the feature point selection step, the coordinate values (X-axis data, Z-axis data) of the representative point 32a of the minute range of the scanning locus K (data) at which the rate of variation becomes less than a predetermined value or reaches the minimum are obtained.

In the origin setting step, the coordinate values of the highest point 30a of the protrusion 30 of the workpiece W are estimated based on the coordinate values of the representative point 32a of the scanning locus K (data) obtained in the feature point selection step and the correction value of the stylus obtained in advance. In the origin setting step, the origin of the workpiece coordinate system is set relative to an origin setting target point of the workpiece W based on the coordinate values of the highest point 30a of the protrusion 30 of the workpiece W estimated as above.

(4) (The Rate of Change Is Small) The Lowest Point of a Recess

Furthermore, it is also preferable that the step for extracting the feature points based on the representative points of the minute ranges at which the rate of variation of the inclination angle of a feature area data is small as described above is used for the case where, for example, the recess 34 is formed on the workpiece W as shown in FIG. 10 (B) and the origin of the workpiece coordinate system is set based on the coordinate values of the lowest point 34a of the recess 34 of the workpiece W.

In this case, it is preferable to execute an input step and an origin setting step described as follows are executed together with the feature point selection step.

That is, in the input step, feature area data obtained by scanning over at least the recess 34 of the workpiece W with the stylus of the surface texture measuring machine are inputted.

Furthermore, in the feature point selection step, the inclination angle of each minute range of the feature area data against the X-axis direction is obtained based on the feature area data obtained in the input step, and the rate of variation between the inclination angles of each minute range adjacent to each other is obtained. In the feature point selection step, the coordinate values (X-axis data, Z-axis data) of the representative point 36a of the minute range of the scanning locus K (data) at which the rate of variation becomes less than a predetermined value or reaches the minimum are obtained.

In the origin setting step, the coordinate values of the lowest point 34a of the recess 34 of the workpiece W is estimated based on the coordinate values of the representative point 36a obtained in the feature point selection step and the correction value of the stylus obtained in advance. In the origin setting step, the origin of the workpiece coordinate system is set relative to an origin setting target point of the workpiece W based on the coordinate values of the lowest point 34a of the recess 34 of the workpiece W estimated as above.

The Sign of Inclination Angle

In addition, when necessary, it is also possible to determine and extract the representative points of the minute ranges at which the sign attached to the inclination angle has changed, as the feature points.

(1) The Highest Point of a Protrusion

It is also preferable that the step for extracting the feature points based on the sign attached to the inclination angle as described above is used for the case where, for example, the protrusion 30 is formed on the workpiece W as shown in FIG. 10 (A) and the origin of the workpiece coordinate system is set based on the coordinate values of the highest point 30a of the protrusion 30 of the workpiece W.

In this case, it is preferable to execute an input step and an origin setting step described as follows are executed together with the feature point selection step.

That is, in the input step, feature area data obtained by scanning over at least the protrusion 30 of the surface of the workpiece W with the stylus of the surface texture measuring machine are inputted.

Furthermore, in the feature point selection step, the inclination angles of minute ranges of the feature area data against the X-axis direction are obtained based on the feature area data obtained in the input step. The coordinate values (X-axis data, Z-axis data) of the feature point 32a of the scanning locus K (data) at which the sign attached to the inclination angle changes from ascending to descending are obtained.

In the origin setting step, the coordinate values of the highest point 30a of the protrusion 30 of the workpiece W are estimated based on the coordinate values of the feature point 32a of the feature area data obtained in the feature point selection step and the correction value of the stylus obtained in advance. In the origin setting step, the origin of the workpiece coordinate system is set relative to an origin setting target point of the workpiece W based on the coordinate values of the highest point 30a of the protrusion 30 of the workpiece W estimated as above.

(2) The Lowest Point of a Recess

Furthermore, it is also preferable that the step for extracting the feature points based on the sign attached to the inclination angle as described above is used for the case where, for example, the recess 34 is formed on the surface of the workpiece W as shown in FIG. 10 (B) and the origin of the workpiece coordinate system is set based on the coordinate values of the lowest point 34a of the recess 34 of the workpiece W.

In this case, it is preferable to execute an input step and an origin setting step described as follows are executed together with the feature point selection step.

That is, in the input step, feature area data obtained by scanning over at least the recess 34 of the workpiece W with the stylus of the surface texture measuring machine are inputted.

In the feature point selection step, the inclination angles of minute ranges of the feature area data against the X-axis direction are obtained based on the feature area data obtained in the input step. In the feature point selection step, the coordinate values of the feature point 36a of the scanning locus K (data) at which the sign attached to the inclination angle of the feature area data changes are obtained.

In the origin setting step, the coordinate values of the lowest point 34a of the recess 34 of the workpiece W are estimated based on the coordinate values of the feature point 36a of the feature area data obtained in the feature point selection step and the correction value of the stylus obtained in advance. In the origin setting step, the origin of the workpiece coordinate system is set relative to an origin setting target point of the workpiece W based on the coordinate values of the lowest point 34a of the recess 34 of the workpiece W estimated as above.

Figure 11:
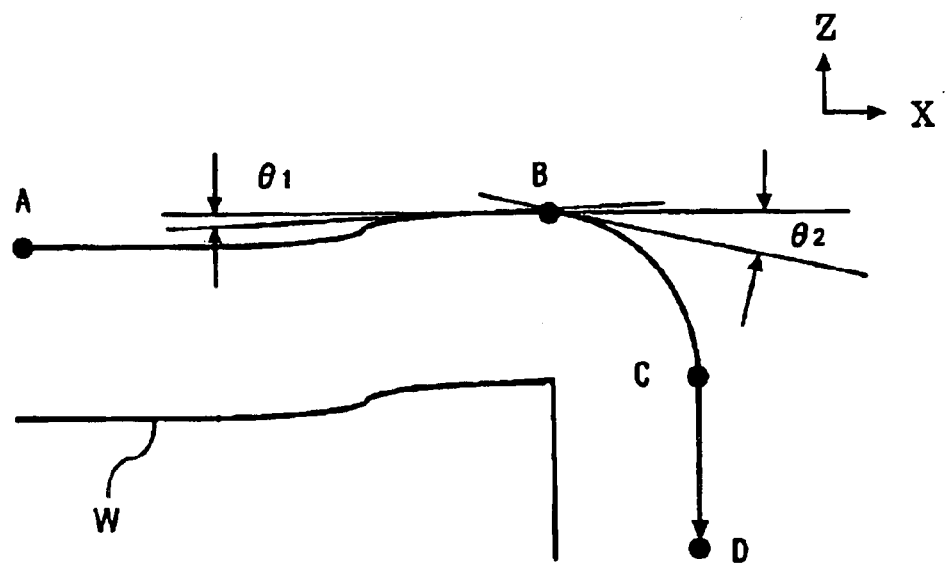
FIG. 11 is another diagram illustrating the inclination angle determining method according to the origin setting method.

In the example shown in FIG. 11, the signs attached to the inclination angles against the X-axis are different for an ascending angle $\theta_1$ in a minute range immediately before the highest point B of the protrusion and for a descending angle $\theta_2$ in a minute range immediately after the highest point B of it. Therefore, the point B may be determined to be the highest point of the protrusion. This point may be extracted as a feature point.

<Origin Setting Step>

According to the second embodiment of the feature point extraction, the process is finished with the Step 715 (S715) and the process is transferred to the feature point correction amount calculation step (S80).

When a feature point has been determined by either of the above methods, thereafter, the correction amount of the feature point is calculated in the feature point correction amount calculation step (S80) shown in FIG. 2.

Trigger Level

Figure 12:
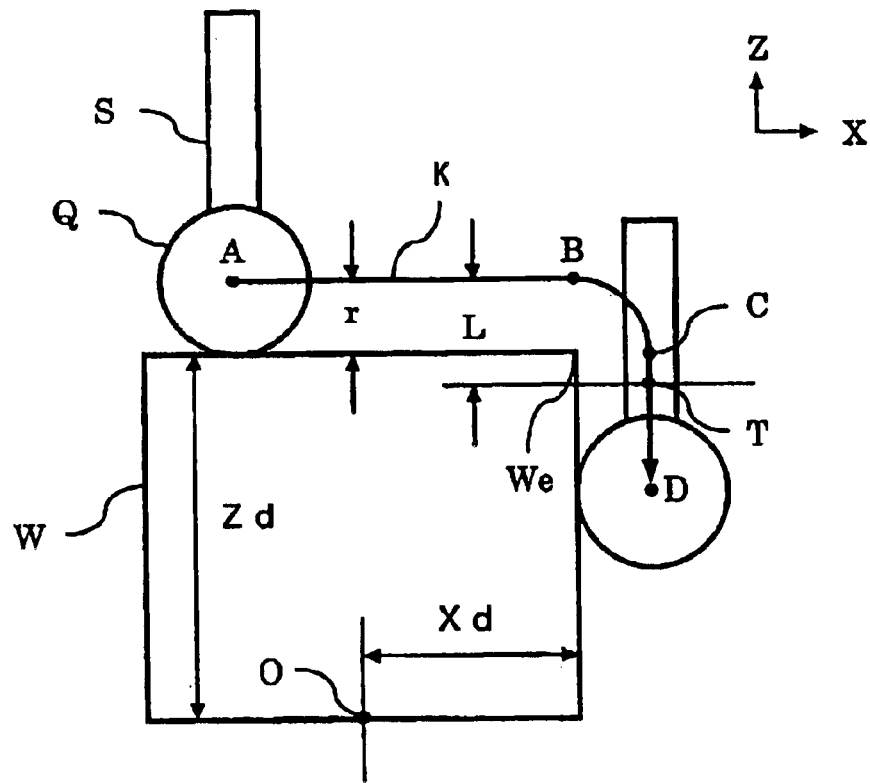
FIG. 12 is a diagram illustrating an origin search according to the origin setting method.

For example, as shown in FIG. 12, for a workpiece W having designed values of $(X_d, Z_d)$, the feature point correction amount calculation for the case where a point O is set as the origin of the workpiece coordinate system will be described. In FIG. 12, when the stylus S is positioned such that the central point of the contacting ball Q of the stylus S coincides with the point O, the origin of the workpiece coordinate system is set such that the coordinate values on the workpiece coordinate system are (0, 0). The radius of the contacting ball Q and the trigger level L have been given in advance.

(1) Where L>=r

Where L>=r, at a point T at which the trigger level L is exceeded, the left side of the contacting ball Q is in a state where it is in contact with the column outer circumferential portion of the workpiece W (see FIG. 12). Here, expressing the coordinate values on the machine coordinate system of the point T (feature point) at which the feature area data (scanning locus K) exceeds the trigger level L as T $(X_p, Z_p)$, an offset $(x_0, z_0)$ is determined such that the following equations, (1) and (2) are satisfied.

$$X_p = X_d + r + x_0 \tag{1}$$

$$Z_p = Z_d - L + r + z_0 \tag{2}$$

In the above equations, $(x_0, z_0)$ indicates the offsets on the X-axis and on the Z-axis for the machine coordinate system.

Figure 13:
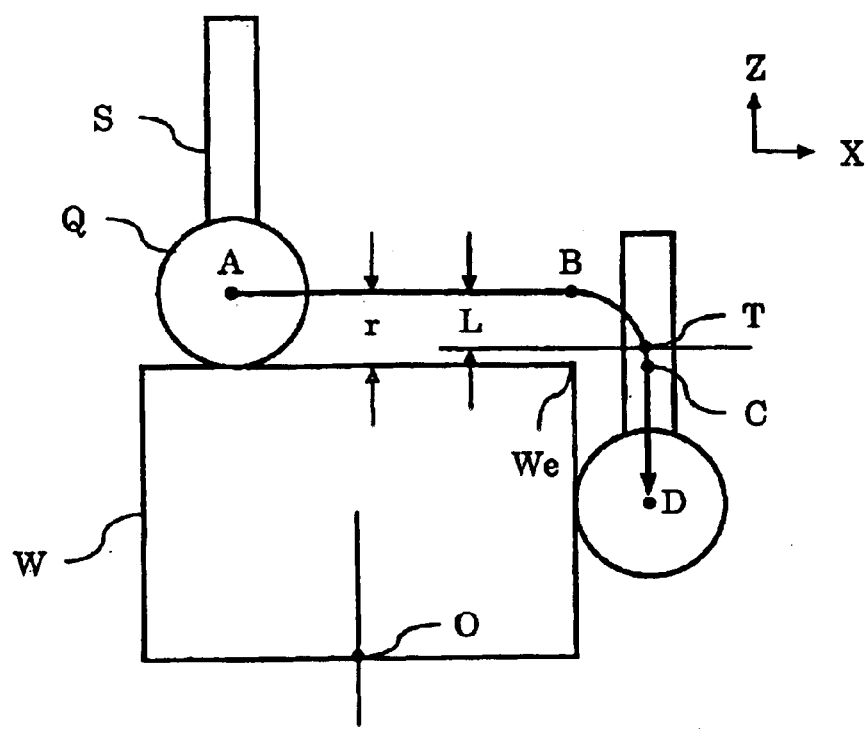
FIG. 13 is another diagram illustrating the origin search according to the origin setting method
Figure 14:
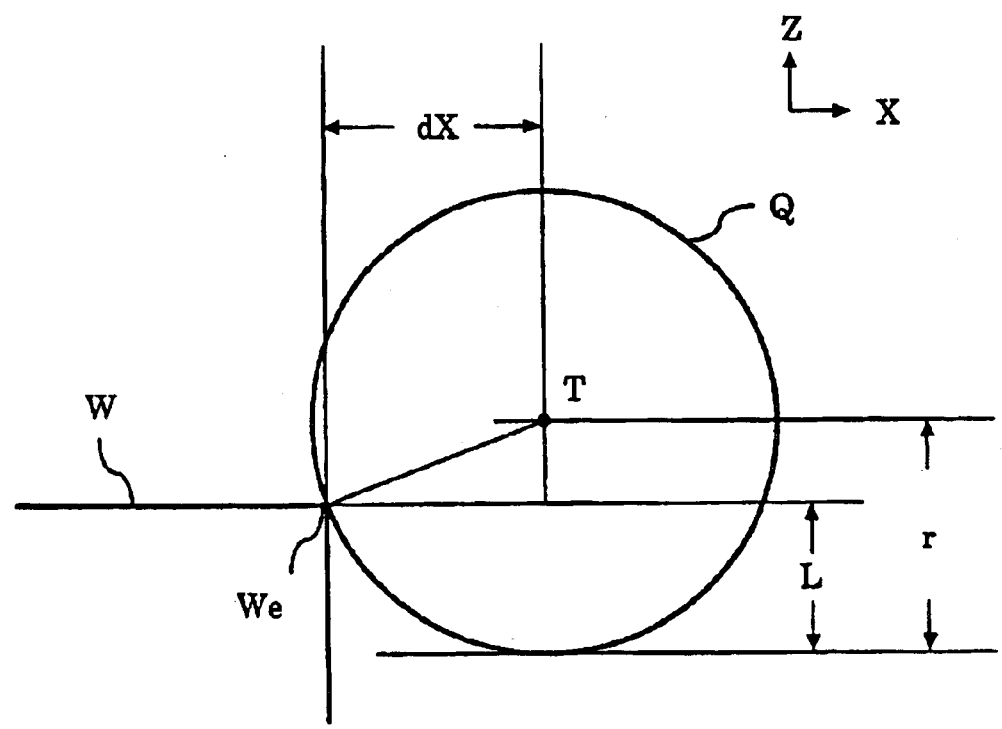
FIG. 14 is a detailed diagram illustrating a trigger level according to the origin setting method.

(2) Where L<r

Where L<r, the relation of positions of the contacting ball Q and the workpiece edge portion $W_e$ for the point T exceeding the trigger level L is the relation as shown in FIG. 13 and FIG. 14.

In this case, the offset $(x_0, z_0)$ is determined such that the equations (3) and (4) are satisfied.

$$X_p = X_d + dX + x_0 \tag{3}$$

$$Z_p = Z_d - L + r + z_0 \tag{4}$$

In the above equations, dX can be easily calculated using the equation (5) if the tip of the contacting ball Q is almost a sphere.

$$(dX)^2 = r^2 - (r-L)^2 \qquad (5)$$

Figure 15:
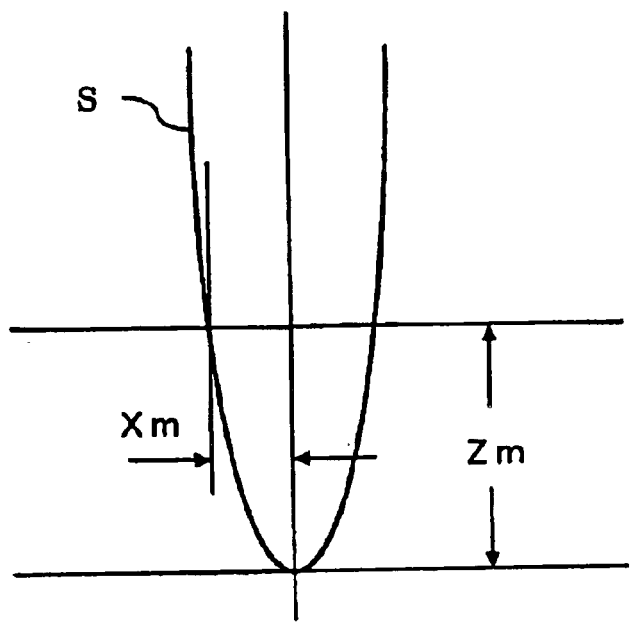
FIG. 15 is a diagram illustrating a stylus.

In the case where the tip of the stylus S has a complicated shape not suitable for being processed by the calculation, the correction value of the stylus S for the points corresponding to the trigger level L has been measured and set in advance. For example, in the case where the tip of the stylus S has a shape as shown in FIG. 15, the values of $X_m$ and $Z_m$ may be set as the correction values (the correction value of the stylus).

Here, the correction value is obtained for the position where $Z_m = L$. In the case where such stylus S is used, the above equations (3) and (4) are altered to the following equations (6) and (7).

$$X_p = X_d + X_m + x_0 \qquad (6)$$

$$Z_p = Z_d - L + z_0 \text{(where } L = Z_m) \qquad (7)$$

In the case shown in FIG. 15, when the center of the tip (the lowest portion) of the stylus Q has been positioned as the origin O, a workpiece coordinate system in which the center is (0, 0) is set.

Figure 16:
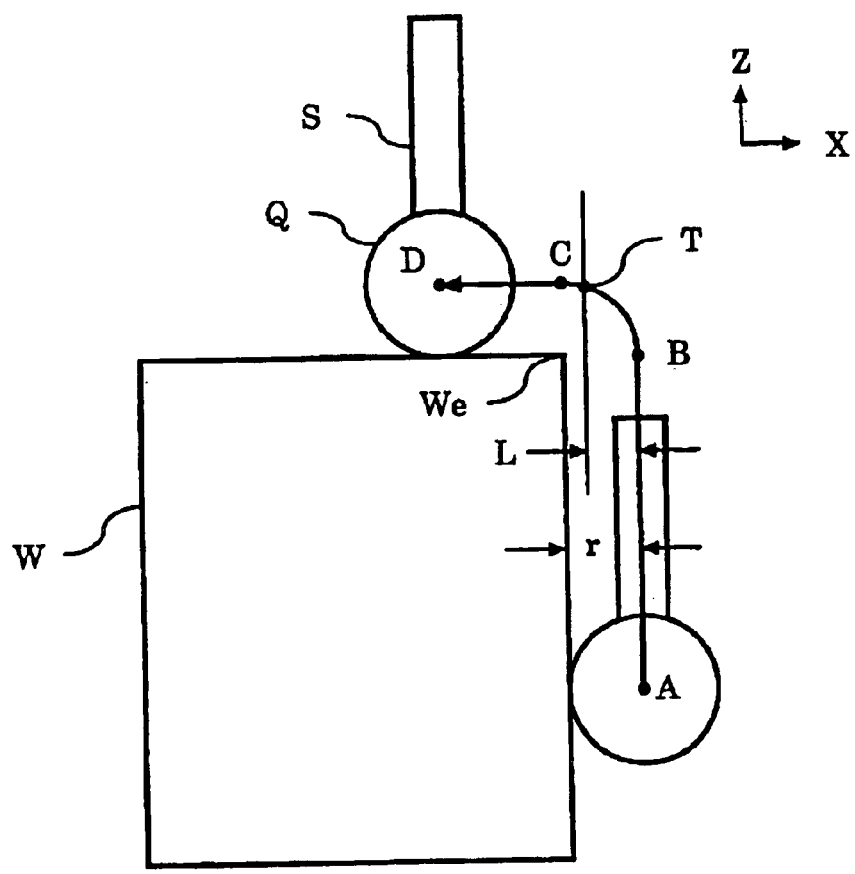
FIG. 16 is another diagram illustrating the origin search according to the origin setting method.
Figure 17:
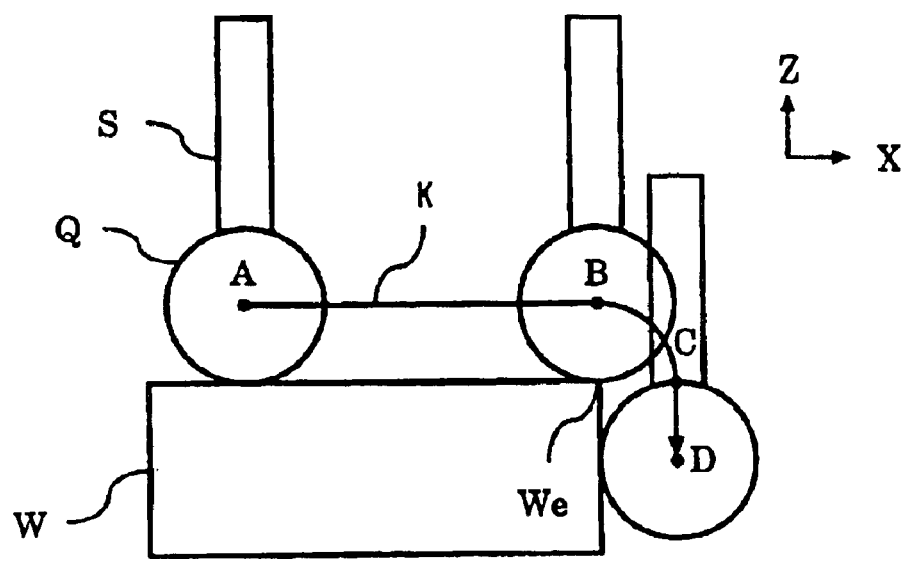
FIG. 17 is a diagram illustrating a conventional technique for an origin setting method.

FIGS. 12–14 show the case where the origin search is executed in the X-axis direction. However, even in the case where the origin search is executed in the Z-axis direction, the calculation may be processed in the same manner as in the case where the origin search is executed in the X-axis direction (see FIG. 16).

Next, in a workpiece coordinate system setting step (S90), the workpiece coordinate system is set.

That is, for coordinate values $(X_c, Z_c)$ on the machine coordinate system, the coordinate values $(X_w, Z_w)$ on the workpiece coordinate system are obtained as in the equations (8) and (9) when the above equations (1)–(4), (6) and (7) are applied.

$$X_w = X_c - x_0 \qquad (8)$$

$$Z_w = Z_c + L - z_0 \qquad (9)$$

Accordingly, $(-x_0)$ for the X-axis and $(L-z_0)$ for the Z-axis respectively are outputted to the surface texture measuring machine as origin setting information of the workpiece coordinate system. The surface texture measuring machine can obtain the coordinate values $(X_w, Z_w)$ on the workpiece coordinate system by executing the process of the above equation (8) and (9) to the coordinate values $(X_c, Z_c)$ on the machine coordinate system. In this case, a point having the coordinate values $(X_w=0, Z_w=0)$ is the origin. Thereby, the origin of the workpiece coordinate system has been set.

In the above embodiment, a setting method of the workpiece coordinate system on which the central position of the lower face of the workpiece W is determined to be the origin by giving the designed values $(X_d, Z_d)$ of the workpiece W has been shown. According to the invention, any desired point of the workpiece not limited to the above point may be set as the origin. For example, in the above equations (1) and (2), a workpiece coordinate system with its origin at a workpiece edge surface $W_e$ shown in FIG. 12 can be set by determining the offset $(x_0, z_0)$ on the X-axis and the Z-axis for the machine coordinate system from substituting zero (0) for both of the designed values $(X_d, Z_d)$ of the workpiece W.

Here, the steps of the feature point correction amount calculation step (S80) and the workpiece coordinate system setting step (S90) constitute the origin setting step of the invention. The steps in the origin setting step are executed by the origin setter 20.

According to the embodiment, there are following effects.

(1) According to the invention, the feature area data are inputted by scanning the feature area of the workpiece, the coordinate values of the feature points of the data is extracted by statistically processing this feature area data, and the origin of the workpiece coordinate system is set based on the coordinate values of the feature points of these data. As a result, according to the invention, it is not necessary to execute any complicated form analysis process, and the process for setting the origin can be executed at a higher speed since the setting of the origin can be executed with a simple statistical calculation.

(2) According to the invention, even when the origin setting method is written as a computer program, the program can be an origin setting program that is compact and capable of processing at a high-speed since the origin setting can be executed by a simple statistical calculation processing.

(3) According to the invention, the device can be made compact since the coordinate values of the workpiece coordinate system are obtained by adding the offsets to the coordinate values of the machine coordinate system and, therefore, the pre-setting of the counting circuit etc. is not necessary.

(4) According to the invention, in addition to that the feature points generated by noises etc. can be removed from the data, the calculation for the statistical processing can be executed after removing the data of areas having protrusions and recesses in the vicinity of the origin of the workpiece coordinate system. Therefore, the accuracy in extracting the feature points of the data can be improved.

(5) According to the invention, as the method for extracting feature points of the data, the coordinate values of the feature points of the data are determined based on the machine coordinate system data of the trigger level and, concurrently, the origin of the workpiece coordinate system is set by correcting the coordinate values of the feature points of the data with the correction values corresponding to this trigger level. As a result, according to the invention, even when a stylus having a contacting portion at its tip, having a shape that is not simple such as a sphere is used, the invention can be implemented.

(6) According to the invention, the reference line is obtained by extracting the line portions from the feature area data, the feature points of the data are determined based on the angle formed by the reference line and the inclined lines of minute ranges of the feature area data. As a result, according to the invention, it is possible to extract the feature points such as protrusions and recesses or edge portions relative to the average plane of the workpiece surface. Furthermore, according to the invention, it is possible to extract the feature points of the data based on the rate of variation of the inclination angles of the minute ranges. Therefore, the invention can be implemented in many kinds of workpieces since various feature points on the workpiece surface can be extracted as the feature points for setting the origin.

As described above, according to the invention, the origin setting of a workpiece coordinate system can be executed accurately and securely. However, the invention is not limited to the above embodiments.

For example, in the origin search shown in FIG. 12, the origin setting has been executed based on only one (1) origin search for the portion from the point A to the point D. However, the accuracy in extracting the feature point of the data is improved by determining its coordinate values by averaging a plurality of extracted feature points after a plurality of origin searches have been executed.

Furthermore, an example is shown in FIG. 12, in which the upper face of the workpiece W is origin-searched over in the direction from the left to the right in the figure. However, instead of this, the origin search may be executed in the direction from the right to the left.

Yet furthermore, for example, in FIG. 12, in addition to the origin search over the workpiece edge portion $W_e$ on the upper right portion, the feature points on both edge portions may be extracted by also origin-searching over the workpiece edge face on the upper left portion. Thereby, the measure of the width of the workpiece W (in this case, the measure of the diameter of the column-shaped workpiece) may be obtained. Furthermore, the measure of the length in the direction of the central axis of the workpiece W may be obtained by measuring the coordinate values of the upper face of the workpiece W and the coordinate values of the upper face of the rotation table (the face to place the workpiece on) and obtaining the difference between them. Thereby, even when the designed values of the workpiece W are not known, the invention can be implemented based on the actually measured measures.

Furthermore, by obtaining the workpiece edge portion $W_e$ on the upper right portion of the workpiece W and the workpiece edge portion on the upper left portion, the center position of the both feature points may be set as the origin of the workpiece coordinate system in the X-axis direction.

Furthermore, in the case for the workpiece coordinate system origin setting for the roundness measuring machine, the origin of the workpiece coordinate system may be set relating to angular positions of the rotation table by fixing the rotation table at a plurality of rotation angular positions and extracting a feature point for each position. Thereby, even when the origin of the workpiece coordinate system is not on the rotation axis of the rotation table, the workpiece coordinate system can be changed dynamically in response to the rotation angle of the rotation table. Thus, according to the invention, a workpiece having a complicated shape can also be measured. In this case, specifically, each offset ($x_0$, $z_0$) in response to the rotation angle of the rotation table has been respectively obtained in advance. Then, the dynamic switching of the workpiece coordinate systems can be executed by changing this offset in response to this rotation angle of the rotation table.

For the case of a surface texture measuring machine capable of executing the relative driving of the workpiece and the stylus with not only the rotation table but also a plurality of driving axes, the dynamic switching of the workpiece coordinate systems may also be executed for each driving axis.

When the process procedures of the flowcharts shown in FIGS. 2–4 are executed using a computer, the origin setting of the workpiece coordinate system of the invention may be executed automatically by storing predetermined data in a memory in advance.

Furthermore, in each of the above embodiment, the method in which the origin of a two (2)-dimensional workpiece coordinate system is set by executing two (2)-dimensional surface texture measurements has been mainly described. However, the origin of a three (3)-dimensional workpiece coordinate system may be set by executing three (3)-dimensional surface texture measurements.

That is, the scanning for inputting the data is not always limited to scanning on a line and spiral scanning may be employed to obtain easily planar area data. As the spiral scanning, for example, in order to obtain the data of the upper face of a column, planar spiral scanning in which the distance from the center of the upper face is increased gradually can be listed as an example. Furthermore, in order to obtain the data of the side of a column, for example, a scanning method in which the outer side of the column is scanned spirally from the lower portion to the upper portion can be employed as an example. In this case, the distance from the center of the column to the measuring point does not vary.

Consequently, according to the invention, since any position of a workpiece can be set freely as the origin, the degree of freedom for origin setting can be improved. Therefore, according to the invention, even for a workpiece having a complicated shape, not only that efficient creation of a measurement program can be executed but also that efficiency of analysis of scanned and collected data can be improved. Furthermore, for the use of the result of the analysis, a significant improvement of efficiency can be facilitated.

Furthermore, when a plurality of styluses are used switching them, the correction value for each stylus may have been stored in advance and these values may be used by switching them automatically or manually. Thereby, according to the invention, even when an automatic stylus exchange machine is used concurrently, automatic switching of the correction values can be carried out easily.

Furthermore, in the embodiment, the case for a surface texture measuring machine that carries out the scanning and measurement by bringing its stylus into contact with the workpiece has been described. However, the invention is not limited to the embodiment. For example, the invention can be implemented even in a non-contacting type measuring machine when the machine is of the type that the measuring characteristics of its stylus are transferred to its scanned and measured data. The "measuring characteristics of the stylus" referred to herein include not only the physical geometric shape of the tip but also the measuring characteristics of the stylus such as detection linearity and dead zones.

Furthermore, the workpiece coordinate system origin setting device of the surface texture measuring machine according to the invention may be constituted being integrated in a surface texture measuring machine. In addition, it may be a device constituting a data inputter/outputter (inputter), a feature point selector and an origin setter by executing a computer program.

Furthermore, the computer program of the invention may be a program creating any high-class languages or intermediate languages such as an interpreter form, not limited by language formats and execution forms.

Furthermore, the computer program of the invention may be a program not stored in a surface texture measuring machine and read in through a communication path when necessary. The origin setting program of a workpiece coordinate system according to the invention is suitable for such an execution form since its calculation process is simple and it is suitable for downsizing.

Furthermore, for each of the above constitution, an example in which the workpiece coordinate system origin is set for a column-shaped workpiece has been described. However, in addition, it is preferable to apply the invention to a workpiece having any shape. As the shape of the workpiece, for example, a cylinder, a circular cone, a quadrangular prism, a quadrangular pyramid, a triangular pyramid, a triangular prism and a shape formed by combining these shapes can be listed as examples.

Furthermore, for each of the above constitutions, an example in which the workpiece is placed on a surface texture measuring machine such that the central axis of the workpiece is in the vertical direction has been described. However, the orientation of the workpiece placed is not limited to this orientation and the workpiece may also be placed in any orientation (for example, the central axis of the workpiece is in the horizontal direction) as far as feature points can be extracted.

Furthermore, for FIG. 3, an example in which either the trigger level determination step (S703) or the inclined line calculation step (S704) is executed has been described. However, the invention is not limited to this example and the determination of feature points may be executed by either one of the steps after executing both of the steps. Otherwise, the more suitable feature points may be selected after the determination of feature points has been executed by both of the steps respectively.

Furthermore, for FIG. 4, an example in which either the maximum/minimum calculation step (S712) or the inclination angle variation rate calculation step (S713) is executed has been described. However, the invention is not limited to this example and the determination of feature points may be executed by either one of the steps after executing both of the steps. Otherwise, the more suitable feature points may selected after the determination of feature points has been executed by both of the steps respectively.

INDUSTRIAL APPLICABILITY

As set forth hereinabove, according to the origin setting method, the origin setting program and the origin setting device for the workpiece coordinate system of a surface texture measuring machine of the invention, feature points of the data obtained by a surface texture measuring machine equipped with a detector such as, for example, a one-axis detector can be extracted from the data by a simple statistical processing. Therefore, setting of the origin of a workpiece coordinate system can be executed accurately and easily based on the extracted feature points of the data.

What is claimed is:

1. A workpiece coordinate system origin setting method of a surface texture measuring machine, the method comprising:
   an input step for inputting data obtained by scanning over a feature area including at least a feature point area and a non-feature point area of a workpiece surface with a detector of the surface texture measuring machine for measuring surface texture by scanning over a workpiece surface;
   a feature point selection step for extracting the coordinate values of feature points of the data by statistically processing the data obtained in the input step; and
   an origin setting step for setting the origin of a workpiece coordinate system relative to an origin setting target point of the workpiece based on the coordinate values of the feature points obtained in the feature point selection step.

2. The workpiece coordinate system origin setting method of a surface texture measuring machine according to claim 1, wherein
   the data inputted in the input step are machine coordinate system data determined uniquely by the surface texture measuring machine.

3. The workpiece coordinate system origin setting method of a surface texture measuring machine according to claim 1, wherein
   the input step includes a predetermined area removing step for removing data of predetermined areas not necessary for the statistical processing in the feature point selection step, from the inputted data.

4. The workpiece coordinate system origin setting method of a surface texture measuring machine according to claim 1, wherein
   the input step includes a singular point removing step for removing singular point data protruded from the inputted data.

5. The workpiece coordinate system origin setting method of a surface texture measuring machine according to claim 4, wherein
   in the singular point removing step, singular point data protruded from the data is removed based on robust estimation.

6. The workpiece coordinate system origin setting method of a surface texture measuring machine according to claim 1, wherein
   in the feature point selection step, the coordinate values of the feature points of the data obtained in the input step are determined based on a trigger level set in advance for the data, and wherein
   in the origin setting step, the origin of the workpiece coordinate system is set relative to the origin setting target point of the workpiece after the coordinate values of the feature points obtained in the feature point selection step are corrected based on a correction value corresponding to the trigger level.

7. The workpiece coordinate system origin setting method of a surface texture measuring machine according to claim 1, wherein
   in the feature point selection step, the coordinate values of the feature points of the data obtained in the input step are determined based on a statistical reference line of data of the non-feature point area in the data.

8. The workpiece coordinate system origin setting method of a surface texture measuring machine according to claim 7, wherein
   in the feature point selection step, the coordinate values of the feature points of the data are determined based on a point for which the data exceeds a predetermined trigger level determined based on the reference line, and wherein
   in the origin setting step, the origin of the workpiece coordinate system is set relative to the origin setting target point of the workpiece after the coordinate values of data feature points obtained in the feature point selection step are corrected based on the correction value corresponding to the magnitude of the trigger level.

9. The workpiece coordinate system origin setting method of a surface texture measuring machine according to claim 8, wherein
   in the feature point selection step, a reference line indicating the direction of the non-feature point areas of the workpiece surface is obtained based on the data of the non-feature point area in the data obtained in the input step, and the data exceeding a trigger level, provided in parallel to the reference line and separated by a predetermined distance in the direction perpendicular to the reference line, for determining that the stylus has moved exceeding the boundary point between the non-feature point area and the feature point area of the workpiece surface are obtained as the coordinate values of the feature points, and wherein
   in the origin setting step, the coordinate values of the boundary point between the non-feature point area and the feature point area of the workpiece surface are estimated based on the coordinate values of the feature points obtained in the feature points selection step, the correction value of the stylus obtained in advance and the trigger level obtained in advance, and the origin of the workpiece coordinate system is set relative to the origin setting target point of the workpiece based on the estimated coordinate values of the boundary point.

10. The workpiece coordinate system origin setting method of a surface texture measuring machine according to claim 9, wherein
when the origin of the workpiece coordinate system is set relative to an origin setting target point other than a feature point of the workpiece surface,
in the origin setting step, the origin of the workpiece coordinate system is set relative to the origin setting target point of the workpiece based on the coordinate values of the feature points obtained in the feature point selection step, the correction value of the stylus obtained in advance, the trigger level obtained in advance and the designed values of the workpiece obtained in advance.

11. The workpiece coordinate system origin setting method of a surface texture measuring machine according to claim 7, wherein
in the feature point selection step, the coordinate values of the feature points of the data are determined based on the point for which the angle formed by the inclined line of each minute range of the data obtained in the input step and the reference line exceeds a predetermined angle.

12. The workpiece coordinate system origin setting method of a surface texture measuring machine according to claim 11, wherein
in the feature point selection step, a reference line indicating the direction of the non-feature point area of the workpiece surface is obtained based on the data of the non-feature point area in the data obtained in the input step, the data is divided into minute ranges, the inclined line of each minute range is obtained, the angles formed by the reference line and the inclined lines are compared and the representative points of the minute ranges for which the angle has exceeded a predetermined angle are obtained as the coordinate values of the feature points of the data, and wherein
in the origin setting step, the coordinate values of the boundary point between a feature point area and a non-feature point area of the workpiece surface are estimated based on the coordinate values of the feature points obtained in the feature point selection step and the correction value of the stylus obtained in advance, and the origin of the workpiece coordinate system is set relative to the origin setting target point of the workpiece based on the estimated coordinate values of the boundary point.

13. The workpiece coordinate system origin setting method of a surface texture measuring machine according to claim 1, wherein
in the feature point selection step, the coordinate values of the feature points of the data obtained in the input step are determined based on the rate of variation of the inclination angle of each minute range of the data.

14. The workpiece coordinate system origin setting method of a surface texture measuring machine according to claim 13, wherein
in the feature point selection step, the coordinate values of the feature points of the data obtained in the input step are determined based on the minute range for which the rate of variation of the inclination angle becomes more than a predetermined value or reaches the maximum.

15. The workpiece coordinate system origin setting method of a surface texture measuring machine according to claim 14, wherein
in the feature point selection step, the inclination angle of each of the minute ranges of the data obtained in the input step against the driving axis direction or the detection axis direction of the stylus is obtained, the rate of variation between the inclination angles of each minute range adjacent to each other is obtained and the representative points of the minute ranges for which the rate of variation becomes more than a predetermined value or reaches the maximum are obtained as the coordinate values of the feature points of the data, and wherein
in the origin setting step, the coordinate values of the boundary point between a non-feature point area and a feature point area of the workpiece surface are estimated based on the coordinate values of the feature point obtained in the feature point selection step and the correction value of the stylus obtained in advance and the origin of the workpiece coordinate system is set relative to the origin setting target point of the workpiece based on the estimated coordinate values of the boundary point.

16. The workpiece coordinate system origin setting method of a surface texture measuring machine according to claim 13, wherein
in the feature point selection step, the coordinate values of the feature points of the data obtained in the input step are determined based on the minute range for which the rate of variation of the inclination angle becomes less than a predetermined value or reaches the minimum.

17. The workpiece coordinate system origin setting method of a surface texture measuring machine according to claim 16, wherein
in the input step, data obtained by scanning over at least a protrusion of the workpiece surface with a stylus of a surface texture measuring machine are inputted, wherein
in the feature point selection step, the inclination angle of each of the minute ranges of the data obtained in the input step against the driving axis direction or the detection axis direction of the stylus is obtained, the rate of variation between the inclination angles of each minute range adjacent to each other is obtained and the representative points of the minute ranges for which the rate of variation becomes less than a predetermined value or reaches the minimum are obtained as the coordinate values of the feature points of the data, and wherein
in the origin setting step, the coordinate values of the highest point of the protrusion of the workpiece surface are estimated based on the coordinate values of the feature point obtained in the feature point selection step and the correction value of the stylus obtained in advance and the origin of the workpiece coordinate system is set relative to the origin setting target point of the workpiece based on the estimated coordinate values of the highest point of the protrusion.

18. The workpiece coordinate system origin setting method of a surface texture measuring machine according to claim 16, wherein
in the input step, data obtained by scanning over at least a recess of the workpiece surface with a stylus of a surface texture measuring machine are inputted, wherein
in the feature point selection step, the inclination angle of each of the minute ranges of the data obtained in the input step against the driving axis direction or the detection axis direction of the stylus is obtained, the rate of variation between the inclination angles of each minute range adjacent to each other is obtained and the representative points of the minute ranges for which the rate of variation becomes less than a predetermined value or reaches the minimum are obtained as the coordinate values of the feature points of the data, and wherein in the origin setting step, the coordinate values of the lowest point of the recess of the workpiece surface are estimated based on the coordinate values of the feature point obtained in the feature point selection step and the correction value of the stylus obtained in advance and the origin of the workpiece coordinate system is set relative to the origin setting target point of the workpiece based on the estimated coordinate values of the lowest point of the recess.

19. The workpiece coordinate system origin setting method of a surface texture measuring machine according to claim 1, wherein in the feature point selection step, the coordinate values of feature points of the data obtained in the input step are determined based on the change of the sign attached to the inclination angle of each minute range of the data obtained in the input step.

20. The workpiece coordinate system origin setting method of a surface texture measuring machine according to claim 19, wherein in the input step, data obtained by scanning over at least a protrusion of the workpiece surface with a stylus of a surface texture measuring machine are inputted, wherein in the feature point selection step, the inclination angle of each of the minute ranges of the data obtained in the input step against the driving axis direction or the detection axis direction of the stylus is obtained and the points at which the sign attached to the inclination angle changes from ascending to descending are obtained as the coordinate values of the feature points of the data, and wherein in the origin setting step, the coordinate values of the highest point of the protrusion of the workpiece surface are estimated based on the coordinate values of the feature point obtained in the feature point selection step and the correction value of the stylus obtained in advance and the origin of the workpiece coordinate system is set relative to the origin setting target point of the workpiece based on the estimated coordinate values of the highest point of the protrusion.

21. The workpiece coordinate system origin setting method of a surface texture measuring machine according to claim 19, wherein in the input step, data obtained by scanning over at least a recess of the workpiece surface with a stylus of a surface texture measuring machine are inputted, wherein in the feature point selection step, the inclination angle of each of the minute ranges of the data obtained in the input step against the driving axis direction or the detection axis direction of the stylus is obtained and the points at which the sign attached to the inclination angle changes from descending to ascending are obtained as the coordinate values of the feature points of the data, and wherein in the origin setting step, the coordinate values of the lowest point of the recess of the workpiece surface are estimated based on the coordinate values of the feature point obtained in the feature point selection step and the correction value of the stylus obtained in advance and the origin of the workpiece coordinate system is set relative to the origin setting target point of the workpiece based on the estimated coordinate values of the lowest point of the recess.

22. The workpiece coordinate system origin setting method of a surface texture measuring machine according to claim 1, wherein in the feature point selection step, the coordinate values of the feature points of the data are determined based on the maximum or the minimum of the data obtained in the input step.

23. The workpiece coordinate system origin setting method of a surface texture measuring machine according to claim 22, wherein in the input step, data obtained by scanning over at least a protrusion of the workpiece surface with a stylus of a surface texture measuring machine are inputted, wherein in the feature point selection step, the coordinate values of the feature point which is the maximum of the data obtained in the input step are obtained, and wherein in the origin setting step, the coordinate values of the highest point of the protrusion of the workpiece surface are estimated based on the coordinate values of the feature point obtained in the feature point selection step and on the correction value of the stylus obtained in advance and the origin of the workpiece coordinate system is set relative to the origin setting target point of the workpiece based on the estimated coordinate values of the highest point of the protrusion.

24. The workpiece coordinate system origin setting method of a surface texture measuring machine according to claim 22, wherein in the input step, data obtained by scanning over at least a recess of the workpiece surface with a stylus of a surface texture measuring machine are inputted, wherein in the feature point selection step, the coordinate values of the feature point which is the minimum of the data obtained in the input step are obtained, and wherein in the origin setting step, the coordinate values of the lowest point of the recess of the workpiece surface are estimated based on the coordinate values of the feature point obtained in the feature point selection step and the correction value of the stylus obtained in advance and the origin of the workpiece coordinate system is set relative to the origin setting target point of the workpiece based on the estimated coordinate values of the lowest point of the recess.

25. A workpiece coordinate system origin setting program of a surface texture measuring machine, wherein the program causes a computer to execute a workpiece coordinate system origin setting method of a surface texture measuring machine according to claim 1.

26. A workpiece coordinate system origin setting device of a surface texture measuring machine, wherein the device comprises:

a data inputter for inputting data obtained by scanning a feature area including at least a feature point area and a non-feature point area of the surface of a workpiece with a detector of a surface texture measuring machine measuring surface texture by scanning the surface of the workpiece;

a feature point selector for extracting the coordinate values of feature points of the data by statistically processing the data inputted into the data inputter; and an origin setter for setting the origin of a workpiece coordinate system relative to an origin setting target point of the workpiece based on the coordinate values of the feature point obtained by the feature point selector.

* * * * *